(12) United States Patent
Procter et al.

(10) Patent No.: US 12,474,282 B2
(45) Date of Patent: Nov. 18, 2025

(54) SYSTEMS AND A METHOD OF IMPROVED MATERIAL CLASSIFICATION USING ENERGY-INTEGRATED BACKSCATTER DETECTORS

(71) Applicant: Rapiscan Holdings, Inc., Hawthorne, CA (US)

(72) Inventors: Mark Procter, Wilmslow (GB); Sarah Louise Fisher, Woking (GB)

(73) Assignee: Rapiscan Holdings, Inc., Torrance, CA (US)

( * ) Notice: Subject to any disclaimer, the term of this patent is extended or adjusted under 35 U.S.C. 154(b) by 383 days.

(21) Appl. No.: 18/318,889

(22) Filed: May 17, 2023

(65) Prior Publication Data

US 2024/0003834 A1    Jan. 4, 2024

Related U.S. Application Data

(60) Provisional application No. 63/365,103, filed on May 20, 2022.

(51) Int. Cl.
*G01N 23/203*    (2006.01)

(52) U.S. Cl.
CPC .................. *G01N 23/203* (2013.01)

(58) Field of Classification Search
CPC ...................................... G01N 23/203
See application file for complete search history.

(56) References Cited

U.S. PATENT DOCUMENTS

| | | | |
|---|---|---|---|
| 2,636,619 A | 4/1953 | Alexander |
| 3,275,831 A | 9/1966 | Martin |
| 3,374,355 A | 3/1968 | Parratt |
| 3,439,166 A | 4/1969 | Chope |
| 3,837,502 A | 9/1974 | Hornagold |
| 3,904,923 A | 9/1975 | Schwartz |
| 4,164,138 A | 8/1979 | Burkhart |
| 4,239,969 A | 12/1980 | Galetta |

(Continued)

FOREIGN PATENT DOCUMENTS

| | | |
|---|---|---|
| AT | 406586 T | 9/2008 |
| AT | 553401 T | 4/2012 |

(Continued)

OTHER PUBLICATIONS

CRS Report for Congress, Aviation Security Technologies and Procedures: Screening Passengers and Baggage, Oct. 26, 2001, pp. 1-12.

(Continued)

*Primary Examiner* — David P Porta
*Assistant Examiner* — Miya Downing
(74) *Attorney, Agent, or Firm* — Novel IP

(57) ABSTRACT

The present specification describes a system of acquiring spectral information from backscatter scan data acquired using a detector panel having an array of 'm' spatially distributed, independent detector assemblies or modules an array of 'n' filters positioned over the array of detector assemblies or modules. In some embodiments, m=n. From the acquired set of detector response measurements, an energy spectrum is mathematically reconstructed or calculated by formulating and solving the energy reconstruction problem as an inverse problem.

20 Claims, 16 Drawing Sheets

(56) References Cited

U.S. PATENT DOCUMENTS

| | | | |
|---|---|---|---|
| 4,658,408 A | 4/1987 | Amor |
| 5,014,293 A | 5/1991 | Boyd |
| 5,041,728 A | 8/1991 | Spacher |
| 5,065,418 A | 11/1991 | Bermbach |
| 5,181,234 A | 1/1993 | Smith |
| 5,185,778 A | 2/1993 | Magram |
| 5,197,088 A | 3/1993 | Vincent |
| 5,202,932 A | 4/1993 | Cambier |
| 5,259,012 A | 11/1993 | Baker |
| 5,363,940 A | 11/1994 | Fahrion |
| 5,493,596 A | 2/1996 | Annis |
| 5,503,424 A | 4/1996 | Agopian |
| 5,600,303 A | 2/1997 | Husseiny |
| 5,606,167 A | 2/1997 | Miller |
| 5,692,028 A | 11/1997 | Geus |
| 5,692,029 A | 11/1997 | Husseiny |
| 5,842,578 A | 12/1998 | Cordeiro |
| 5,909,478 A | 6/1999 | Polichar |
| 5,910,973 A | 6/1999 | Grodzins |
| 5,940,468 A | 8/1999 | Huang |
| 5,974,111 A | 10/1999 | Krug |
| 6,056,671 A | 5/2000 | Marmer |
| 6,067,344 A | 5/2000 | Grodzins |
| 6,081,580 A | 6/2000 | Grodzins |
| 6,151,381 A | 11/2000 | Grodzins |
| 6,192,104 B1 | 2/2001 | Adams |
| 6,216,540 B1 | 4/2001 | Nelson |
| 6,220,099 B1 | 4/2001 | Marti |
| 6,249,567 B1 | 6/2001 | Rothschild |
| 6,282,260 B1 | 8/2001 | Grodzins |
| 6,292,533 B1 | 9/2001 | Swift |
| 6,301,327 B1 | 10/2001 | Martens |
| 6,320,933 B1 | 11/2001 | Grodzins |
| 6,347,132 B1 | 2/2002 | Annis |
| 6,418,194 B1 | 7/2002 | McPherson |
| 6,424,695 B1 | 7/2002 | Grodzins |
| 6,453,007 B2 | 9/2002 | Adams |
| 6,459,761 B1 | 10/2002 | Grodzins |
| 6,459,764 B1 | 10/2002 | Chalmers |
| 6,542,574 B2 | 4/2003 | Grodzins |
| 6,542,580 B1 | 4/2003 | Carver |
| 6,546,072 B1 | 4/2003 | Chalmers |
| 6,552,346 B2 | 4/2003 | Verbinski |
| 6,614,872 B2 | 9/2003 | Bueno |
| 6,658,087 B2 | 12/2003 | Chalmers |
| 6,665,373 B1 | 12/2003 | Kotowski |
| 6,702,459 B2 | 3/2004 | Barnes |
| 6,713,773 B1 | 3/2004 | Lyons |
| 6,843,599 B2 | 1/2005 | Le |
| 6,920,197 B2 | 7/2005 | Kang |
| 6,924,487 B2 | 8/2005 | Bolozdynya |
| 6,928,141 B2 | 8/2005 | Carver |
| 6,940,071 B2 | 9/2005 | Ramsden |
| 6,944,263 B2 | 9/2005 | Xiao |
| 7,010,094 B2 | 3/2006 | Grodzins |
| 7,039,159 B2 | 5/2006 | Muenchau |
| 7,046,768 B1 | 5/2006 | Gilevich |
| 7,095,326 B2 | 8/2006 | Young |
| 7,099,434 B2 | 8/2006 | Adams |
| RE39,396 E | 11/2006 | Swift |
| 7,151,447 B1 | 12/2006 | Willms |
| 7,202,478 B2 | 4/2007 | Ramsden |
| 7,203,276 B2 | 4/2007 | Arsenault |
| 7,207,713 B2 | 4/2007 | Lowman |
| 7,215,737 B2 | 5/2007 | Li |
| 7,215,738 B2 | 5/2007 | Muenchau |
| 7,218,704 B1 | 5/2007 | Adams |
| 7,239,245 B2 | 7/2007 | Kang |
| 7,244,947 B2 | 7/2007 | Polichar |
| 7,302,035 B2 | 11/2007 | Hu |
| 7,322,745 B2 | 1/2008 | Agrawal |
| 7,352,843 B2 | 4/2008 | Hu |
| 7,352,844 B1 | 4/2008 | Muenchau |
| 7,366,282 B2 | 4/2008 | Peschmann |
| 7,369,643 B2 | 5/2008 | Kotowski |
| 7,372,040 B2 | 5/2008 | Polichar |
| 7,379,530 B2 | 5/2008 | Hoff |
| 7,386,093 B2 | 6/2008 | Wu |
| 7,388,209 B1 | 6/2008 | Gormley |
| 7,397,891 B2 | 7/2008 | Johnson |
| 7,399,976 B2 | 7/2008 | Kang |
| 7,400,701 B1 | 7/2008 | Cason |
| 7,400,706 B2 | 7/2008 | Li |
| 7,417,440 B2 | 8/2008 | Peschmann |
| 7,418,077 B2 | 8/2008 | Gray |
| 7,453,987 B1 | 11/2008 | Richardson |
| 7,456,780 B1 | 11/2008 | Garren |
| 7,470,914 B2 | 12/2008 | Li |
| 7,471,764 B2 | 12/2008 | Kaval |
| 7,483,510 B2 | 1/2009 | Carver |
| 7,486,768 B2 | 2/2009 | Allman |
| 7,499,522 B2 | 3/2009 | Chen |
| 7,504,635 B2 | 3/2009 | Ramsden |
| 7,505,556 B2 | 3/2009 | Chalmers |
| 7,505,562 B2 | 3/2009 | Dinca |
| 7,508,908 B2 | 3/2009 | Hu |
| 7,512,212 B2 | 3/2009 | Li |
| 7,517,149 B2 | 4/2009 | Agrawal |
| 7,519,148 B2 | 4/2009 | Kotowski |
| 7,525,101 B2 | 4/2009 | Grodzins |
| 7,526,064 B2 | 4/2009 | Akery |
| 7,538,325 B2 | 5/2009 | Mishin |
| 7,547,887 B2 | 6/2009 | Ramsden |
| 7,555,099 B2 | 6/2009 | Rothschild |
| 7,570,737 B2 | 8/2009 | Kang |
| 7,579,845 B2 | 8/2009 | Peschmann |
| 7,580,505 B2 | 8/2009 | Kang |
| 7,593,506 B2 | 9/2009 | Cason |
| 7,593,510 B2 | 9/2009 | Rothschild |
| 7,596,275 B1 | 9/2009 | Richardson |
| 7,634,055 B2 | 12/2009 | Hu |
| 7,647,189 B2 | 1/2010 | Kang |
| 7,660,388 B2 | 2/2010 | Gray |
| 7,663,109 B2 | 2/2010 | Kang |
| 7,683,336 B2 | 3/2010 | Ramsden |
| 7,684,538 B2 | 3/2010 | Morton |
| 7,684,541 B2 | 3/2010 | Wang |
| 7,702,070 B2 | 4/2010 | Kang |
| 7,720,195 B2 | 5/2010 | Allman |
| 7,722,251 B2 | 5/2010 | Kang |
| 7,724,868 B2 | 5/2010 | Morton |
| 7,742,568 B2 | 6/2010 | Smith |
| 7,760,852 B2 | 7/2010 | Chen |
| 7,769,133 B2 | 8/2010 | Carver |
| 7,783,004 B2 | 8/2010 | Kotowski |
| 7,783,005 B2 | 8/2010 | Kaval |
| 7,807,964 B2 | 10/2010 | Li |
| 7,817,775 B2 | 10/2010 | Kang |
| 7,817,776 B2 | 10/2010 | Agrawal |
| 7,820,973 B2 | 10/2010 | Ruan |
| 7,852,981 B2 | 12/2010 | Luo |
| 7,856,081 B2 | 12/2010 | Peschmann |
| 7,860,213 B2 | 12/2010 | Akery |
| 7,864,920 B2 | 1/2011 | Rothschild |
| 7,876,879 B2 | 1/2011 | Morton |
| 7,876,880 B2 | 1/2011 | Kotowski |
| 7,903,789 B2 | 3/2011 | Morton |
| 7,915,596 B2 | 3/2011 | Clothier |
| 7,924,975 B2 | 4/2011 | Zhang |
| 7,928,400 B1 | 4/2011 | Diawara |
| 7,929,663 B2 | 4/2011 | Morton |
| 7,942,576 B2 | 5/2011 | Zhao |
| 7,947,957 B2 | 5/2011 | Ruan |
| 7,949,101 B2 | 5/2011 | Morton |
| 7,963,695 B2 | 6/2011 | Kotowski |
| 7,982,191 B2 | 7/2011 | Friedman |
| 7,991,113 B2 | 8/2011 | Carver |
| 7,991,133 B2 | 8/2011 | Mills |
| 7,995,705 B2 | 8/2011 | Allman |
| 7,995,707 B2 | 8/2011 | Rothschild |
| 8,013,297 B2 | 9/2011 | Peng |
| 8,054,938 B2 | 11/2011 | Kaval |
| 8,059,781 B2 | 11/2011 | Agrawal |
| 8,073,099 B2 | 12/2011 | Niu |

(56) References Cited

U.S. PATENT DOCUMENTS

| | | |
|---|---|---|
| 8,084,748 B2 | 12/2011 | Peng |
| 8,085,897 B2 | 12/2011 | Morton |
| 8,094,784 B2 | 1/2012 | Morton |
| 8,129,691 B2 | 3/2012 | Hu |
| 8,135,110 B2 | 3/2012 | Morton |
| 8,138,770 B2 | 3/2012 | Peschmann |
| 8,170,177 B2 | 5/2012 | Akery |
| 8,204,173 B2 | 6/2012 | Betcke |
| 8,217,365 B2 | 7/2012 | Chen |
| 8,223,919 B2 | 7/2012 | Morton |
| 8,243,876 B2 | 8/2012 | Morton |
| 8,247,776 B2 | 8/2012 | Peng |
| 8,275,091 B2 | 9/2012 | Morton |
| 8,275,092 B1 | 9/2012 | Zhang |
| 8,288,718 B2 | 10/2012 | Li |
| 8,319,188 B2 | 11/2012 | Ramsden |
| 8,325,871 B2 | 12/2012 | Grodzins |
| 8,331,535 B2 | 12/2012 | Morton |
| 8,345,819 B2 | 1/2013 | Mastronardi |
| 8,356,937 B2 | 1/2013 | Kotowski |
| 8,374,310 B2 | 2/2013 | Kang |
| 8,374,993 B2 | 2/2013 | Ramsden |
| 8,384,016 B2 | 2/2013 | Ramsden |
| 8,385,501 B2 | 2/2013 | Allman |
| 8,389,942 B2 | 3/2013 | Morton |
| 8,396,189 B2 | 3/2013 | Kang |
| 8,428,217 B2 | 4/2013 | Peschmann |
| 8,433,036 B2 | 4/2013 | Morton |
| 8,439,565 B2 | 5/2013 | Mastronardi |
| 8,442,186 B2 | 5/2013 | Rothschild |
| 8,451,974 B2 | 5/2013 | Morton |
| 8,457,274 B2 | 6/2013 | Arodzero |
| 8,457,275 B2 | 6/2013 | Akery |
| 8,477,902 B2 | 7/2013 | Li |
| 8,483,356 B2 | 7/2013 | Bendahan |
| 8,491,189 B2 | 7/2013 | Kotowski |
| 8,503,605 B2 | 8/2013 | Morton |
| 8,503,606 B2 | 8/2013 | Rothschild |
| 8,532,823 B2 | 9/2013 | Mcelroy |
| 8,552,722 B2 | 10/2013 | Lionheart |
| 8,559,592 B2 | 10/2013 | Betcke |
| 8,579,506 B2 | 11/2013 | Morton |
| 8,582,857 B2 | 11/2013 | Chen |
| 8,625,735 B2 | 1/2014 | Morton |
| 8,644,453 B2 | 2/2014 | Morton |
| 8,668,386 B2 | 3/2014 | Morton |
| 8,674,706 B2 | 3/2014 | Peschmann |
| 8,679,409 B2 | 3/2014 | Zhang |
| 8,687,765 B2 | 4/2014 | Kotowski |
| 8,690,427 B2 | 4/2014 | Mastronardi |
| 8,735,833 B2 | 5/2014 | Morton |
| 8,750,452 B2 | 6/2014 | Kaval |
| 8,774,357 B2 | 7/2014 | Morton |
| 8,798,232 B2 | 8/2014 | Bendahan |
| 8,804,899 B2 | 8/2014 | Morton |
| 8,824,632 B2 | 9/2014 | Mastronardi |
| 8,824,637 B2 | 9/2014 | Morton |
| 8,831,176 B2 | 9/2014 | Morton |
| 8,831,305 B2 | 9/2014 | Zhang |
| 8,837,669 B2 | 9/2014 | Morton |
| 8,837,670 B2 | 9/2014 | Akery |
| 8,840,303 B2 | 9/2014 | Morton |
| 8,842,808 B2 | 9/2014 | Rothschild |
| 8,859,981 B1 | 10/2014 | Stoian |
| 8,861,684 B2 | 10/2014 | Al-Kofahi |
| 8,884,236 B2 | 11/2014 | Rothschild |
| 8,885,794 B2 | 11/2014 | Morton |
| 8,903,045 B2 | 12/2014 | Schubert |
| 8,908,831 B2 | 12/2014 | Bendahan |
| 8,913,707 B2 | 12/2014 | Kang |
| 8,923,481 B2 | 12/2014 | Schubert |
| 8,929,509 B2 | 1/2015 | Morton |
| 8,958,526 B2 | 2/2015 | Morton |
| 8,971,485 B2 | 3/2015 | Morton |
| 8,971,487 B2 | 3/2015 | Mastronardi |
| 8,983,033 B2 | 3/2015 | Chen |
| 8,993,970 B2 | 3/2015 | Morton |
| 9,001,973 B2 | 4/2015 | Morton |
| 9,014,339 B2 | 4/2015 | Grodzins |
| 9,020,095 B2 | 4/2015 | Morton |
| 9,020,096 B2 | 4/2015 | Allman |
| 9,020,103 B2 | 4/2015 | Grodzins |
| 9,025,731 B2 | 5/2015 | Kotowski |
| 9,036,779 B2 | 5/2015 | Morton |
| 9,037,342 B2 | 5/2015 | Shi |
| 9,042,511 B2 | 5/2015 | Peschmann |
| 9,046,465 B2 | 6/2015 | Thompson |
| 9,046,613 B2 | 6/2015 | Ramsden |
| 9,048,061 B2 | 6/2015 | Morton |
| 9,052,271 B2 | 6/2015 | Grodzins |
| 9,052,403 B2 | 6/2015 | Morton |
| 9,057,679 B2 | 6/2015 | Morton |
| 9,081,099 B2 | 7/2015 | Kang |
| 9,086,497 B2 | 7/2015 | Bendahan |
| 9,093,245 B2 | 7/2015 | Morton |
| 9,099,279 B2 | 8/2015 | Rommel |
| 9,111,331 B2 | 8/2015 | Parikh |
| 9,113,839 B2 | 8/2015 | Morton |
| 9,117,564 B2 | 8/2015 | Rommel |
| 9,121,958 B2 | 9/2015 | Morton |
| 9,128,200 B2 | 9/2015 | Muenster |
| 9,146,201 B2 | 9/2015 | Schubert |
| 9,158,027 B2 | 10/2015 | Morton |
| 9,158,030 B2 | 10/2015 | Morton |
| 9,182,515 B2 | 11/2015 | Stoian |
| 9,183,647 B2 | 11/2015 | Morton |
| 9,208,988 B2 | 12/2015 | Morton |
| 9,218,933 B2 | 12/2015 | Langeveld |
| 9,223,049 B2 | 12/2015 | Kotowski |
| 9,223,050 B2 | 12/2015 | Kaval |
| 9,223,052 B2 | 12/2015 | Morton |
| 9,257,208 B2 | 2/2016 | Rommel |
| 9,263,225 B2 | 2/2016 | Morton |
| 9,268,027 B2 | 2/2016 | Kang |
| 9,268,044 B2 | 2/2016 | Ramsden |
| 9,268,058 B2 | 2/2016 | Peschmann |
| 9,274,065 B2 | 3/2016 | Morton |
| 9,279,901 B2 | 3/2016 | Akery |
| 9,285,488 B2 | 3/2016 | Arodzero |
| 9,285,498 B2 | 3/2016 | Carver |
| 9,291,582 B2 | 3/2016 | Grodzins |
| 9,310,322 B2 | 4/2016 | Panesar |
| 9,310,323 B2 | 4/2016 | Bendahan |
| 9,316,760 B2 | 4/2016 | Bendahan |
| 9,329,285 B2 | 5/2016 | Gozani |
| 9,332,624 B2 | 5/2016 | Morton |
| 9,417,060 B1 | 8/2016 | Schubert |
| 9,420,677 B2 | 8/2016 | Morton |
| 9,442,082 B2 * | 9/2016 | Morton ............... A61B 6/4266 |
| 9,465,119 B2 | 10/2016 | Manslow |
| 9,466,456 B2 | 10/2016 | Rommel |
| 9,535,019 B1 | 1/2017 | Rothschild |
| 9,535,177 B2 | 1/2017 | Ramsden |
| 9,541,510 B2 | 1/2017 | Arodzero |
| 9,568,637 B2 | 2/2017 | Stoian |
| 9,576,766 B2 | 2/2017 | Morton |
| 9,606,259 B2 | 3/2017 | Morton |
| 9,618,648 B2 | 4/2017 | Morton |
| 9,638,646 B2 | 5/2017 | Morton |
| 9,658,343 B2 | 5/2017 | Arodzero |
| 9,675,306 B2 | 6/2017 | Morton |
| 9,688,517 B2 | 6/2017 | Morton |
| 9,714,920 B2 | 7/2017 | Lionheart |
| 9,720,111 B2 | 8/2017 | Ramsden |
| 9,726,619 B2 | 8/2017 | Thompson |
| 9,747,678 B2 | 8/2017 | Chen |
| 9,747,705 B2 | 8/2017 | Morton |
| 9,817,151 B2 | 11/2017 | Morton |
| 9,880,315 B2 | 1/2018 | Stoian |
| 9,958,569 B2 | 5/2018 | Morton |
| 10,007,019 B2 | 6/2018 | Morton |
| 10,032,021 B2 | 7/2018 | Pedersen |
| 10,107,783 B2 | 10/2018 | Lionheart |
| 10,126,442 B2 | 11/2018 | Ramsden |

(56) References Cited

U.S. PATENT DOCUMENTS

| | | |
|---|---|---|
| 10,168,445 B2 | 1/2019 | Morton |
| 10,175,381 B2 | 1/2019 | Morton |
| 10,228,487 B2 | 3/2019 | Mastronardi |
| 10,274,636 B2 | 4/2019 | Tang |
| 10,295,483 B2 | 5/2019 | Morton |
| 10,302,807 B2 | 5/2019 | Yu |
| 10,310,102 B2 | 6/2019 | Ramsden |
| 10,317,566 B2 | 6/2019 | Morton |
| 10,351,967 B2 | 7/2019 | Wang |
| 10,388,818 B2 | 8/2019 | Zhang |
| 10,408,967 B2 | 9/2019 | Morton |
| 10,429,523 B2 | 10/2019 | Ramsden |
| 10,473,795 B2 | 11/2019 | Wang |
| 10,483,077 B2 | 11/2019 | Morton |
| 10,585,207 B2 | 3/2020 | Morton |
| 10,586,324 B2 | 3/2020 | Zhao |
| 10,591,424 B2 | 3/2020 | Morton |
| 10,646,179 B2 | 5/2020 | Xu |
| 10,663,413 B2 | 5/2020 | Li |
| 10,663,616 B2 | 5/2020 | Morton |
| 10,677,943 B2 | 6/2020 | Moore |
| 10,739,491 B2 | 8/2020 | Yang |
| 10,775,320 B2 | 9/2020 | Li |
| 10,826,606 B1 | 11/2020 | Lundberg |
| 10,901,112 B2 | 1/2021 | Morton |
| 10,901,113 B2 | 1/2021 | Morton |
| 10,976,271 B2 | 4/2021 | Morton |
| 11,561,320 B2 | 1/2023 | Morton |
| 11,796,489 B2 | 10/2023 | Carrington |
| 2002/0094064 A1 | 7/2002 | Zhou |
| 2003/0043964 A1 | 3/2003 | Sorenson |
| 2003/0068557 A1 | 4/2003 | Kumashiro |
| 2004/0051265 A1 | 3/2004 | Nadeau |
| 2004/0120454 A1 | 6/2004 | Ellenbogen |
| 2004/0141584 A1 | 7/2004 | Bernardi |
| 2004/0252024 A1 | 12/2004 | Huey |
| 2004/0258198 A1 | 12/2004 | Carver |
| 2005/0023479 A1 | 2/2005 | Grodzins |
| 2005/0024199 A1 | 2/2005 | Huey |
| 2005/0100135 A1 | 5/2005 | Lowman |
| 2005/0117683 A1 | 6/2005 | Mishin |
| 2005/0135668 A1 | 6/2005 | Polichar |
| 2005/0157842 A1 | 7/2005 | Agrawal |
| 2005/0169421 A1 | 8/2005 | Muenchau |
| 2005/0198226 A1 | 9/2005 | DeLia |
| 2006/0027751 A1 | 2/2006 | Kurita |
| 2006/0056584 A1 | 3/2006 | Allman |
| 2006/0114477 A1 | 6/2006 | Cox |
| 2006/0140341 A1 | 6/2006 | Carver |
| 2006/0182221 A1 | 8/2006 | Bernhardt |
| 2006/0249685 A1 | 11/2006 | Tanaka |
| 2006/0257005 A1 | 11/2006 | Bergeron |
| 2006/0284094 A1 | 12/2006 | Inbar |
| 2007/0085010 A1 | 4/2007 | Letant |
| 2007/0140423 A1 | 6/2007 | Foland |
| 2007/0172129 A1 | 7/2007 | Tortora |
| 2007/0189454 A1 | 8/2007 | Georgeson |
| 2007/0210255 A1 | 9/2007 | Bjorkholm |
| 2007/0228284 A1 | 10/2007 | Polichar |
| 2007/0237293 A1 | 10/2007 | Singh |
| 2007/0280502 A1 | 12/2007 | Paresi |
| 2008/0037707 A1 | 2/2008 | Rothschild |
| 2008/0048872 A1 | 2/2008 | Frank |
| 2008/0084963 A1 | 4/2008 | Clayton |
| 2008/0128624 A1 | 6/2008 | Cooke |
| 2008/0159591 A1 | 7/2008 | Ruedin |
| 2008/0170670 A1 | 7/2008 | Bhatt |
| 2008/0198970 A1 | 8/2008 | Kirshner |
| 2008/0205594 A1 | 8/2008 | Bjorkholm |
| 2008/0230709 A1 | 9/2008 | Tkaczyk |
| 2008/0260097 A1 | 10/2008 | Anwar |
| 2008/0304622 A1 | 12/2008 | Morton |
| 2009/0067575 A1 | 3/2009 | Seppi |
| 2009/0086907 A1 | 4/2009 | Smith |
| 2009/0116617 A1 | 5/2009 | Mastronardi |
| 2009/0127459 A1 | 5/2009 | Neustadter |
| 2009/0168964 A1 | 7/2009 | Safai |
| 2009/0238336 A1 | 9/2009 | Akery |
| 2009/0245462 A1 | 10/2009 | Agrawal |
| 2009/0257555 A1 | 10/2009 | Chalmers |
| 2009/0285353 A1 | 11/2009 | Ellenbogen |
| 2009/0316851 A1 | 12/2009 | Oosaka |
| 2010/0020937 A1 | 1/2010 | Hautmann |
| 2010/0161504 A1 | 6/2010 | Casey |
| 2010/0177868 A1 | 7/2010 | Smith |
| 2010/0177873 A1 | 7/2010 | Chen |
| 2010/0295689 A1 | 11/2010 | Armistead, Jr. |
| 2011/0019797 A1 | 1/2011 | Morton |
| 2011/0019799 A1 | 1/2011 | Shedlock |
| 2011/0038453 A1 | 2/2011 | Morton |
| 2011/0064192 A1 | 3/2011 | Morton |
| 2011/0075808 A1 | 3/2011 | Rothschild |
| 2011/0204243 A1 | 8/2011 | Bendahan |
| 2011/0235777 A1 | 9/2011 | Gozani |
| 2011/0266643 A1 | 11/2011 | Engelmann |
| 2012/0099710 A1 | 4/2012 | Kotowski |
| 2012/0104276 A1 | 5/2012 | Miller |
| 2012/0116720 A1 | 5/2012 | Klann |
| 2013/0001048 A1 | 1/2013 | Panesar |
| 2014/0185771 A1 | 7/2014 | Morton |
| 2014/0197321 A1 | 7/2014 | Bendahan |
| 2015/0036798 A1 | 2/2015 | Morton |
| 2015/0078519 A1 | 3/2015 | Morton |
| 2015/0301220 A1 | 10/2015 | Morton |
| 2015/0355117 A1 | 12/2015 | Morton |
| 2015/0355369 A1 | 12/2015 | Morton |
| 2016/0025889 A1 | 1/2016 | Morton |
| 2016/0033674 A1 | 2/2016 | Allman |
| 2019/0293810 A1* | 9/2019 | Couture ............... G01N 23/203 |
| 2023/0204812 A1 | 6/2023 | Morton |
| 2024/0060913 A1 | 2/2024 | Carrington |

FOREIGN PATENT DOCUMENTS

| | | |
|---|---|---|
| AU | 2008267661 B2 | 4/2011 |
| AU | 2008267660 B2 | 6/2011 |
| AU | 2014299147 B2 | 10/2016 |
| CA | 2481596 C | 11/2009 |
| EP | 0077018 A1 | 4/1983 |
| EP | 0919186 A2 | 6/1999 |
| EP | 1413898 A1 | 4/2004 |
| EP | 1328827 B1 | 8/2008 |
| EP | 2102636 B1 | 4/2012 |
| EP | 2019974 B1 | 8/2013 |
| EP | 2593813 B1 | 4/2014 |
| EP | 2075595 B1 | 4/2015 |
| EP | 2047293 B1 | 5/2015 |
| EP | 2705386 B1 | 9/2015 |
| EP | 2113791 B1 | 8/2016 |
| EP | 2883085 B1 | 8/2018 |
| EP | 1749220 B1 | 10/2019 |
| EP | 2287636 B1 | 10/2019 |
| EP | 3077852 B1 | 12/2019 |
| EP | 2778716 B1 | 4/2020 |
| EP | 3474292 B1 | 9/2020 |
| EP | 3505975 B1 | 1/2021 |
| GB | 2255634 A | 11/1992 |
| GB | 2409268 A | 6/2005 |
| GB | 2401766 B | 3/2006 |
| GB | 2424065 A | 9/2006 |
| GB | 2418015 B | 12/2006 |
| GB | 2438317 A | 11/2007 |
| GB | 2445578 B | 1/2009 |
| GB | 2440588 B | 9/2009 |
| GB | 2432094 B | 4/2010 |
| GB | 2463254 B | 7/2010 |
| GB | 2437979 B | 12/2010 |
| GB | 2463707 B | 6/2011 |
| GB | 2472420 B | 2/2012 |
| GB | 2455906 B | 6/2012 |
| GB | 2490513 B | 11/2015 |
| GB | 2499391 B | 11/2015 |
| GB | 2504771 B | 2/2016 |
| GB | 2522017 B | 9/2017 |

(56) References Cited

FOREIGN PATENT DOCUMENTS

| | | | |
|---|---|---|---|
| GB | 2520762 B | 4/2018 | |
| GB | 2525826 B | 9/2020 | |
| GB | 2555564 B | 9/2020 | |
| GB | 2560552 B | 9/2020 | |
| GB | 2577909 B | 11/2020 | |
| GB | 2552538 B | 12/2020 | |
| WO | 1998055851 A1 | 12/1998 | |
| WO | 2004010127 A1 | 1/2004 | |
| WO | 2005098400 | 10/2005 | |
| WO | 2006036076 A1 | 4/2006 | |
| WO | 2006053279 A2 | 5/2006 | |
| WO | 2006078691 A2 | 7/2006 | |
| WO | 2007035359 A2 | 3/2007 | |
| WO | 2007055720 A2 | 5/2007 | |
| WO | 2007068933 A1 | 6/2007 | |
| WO | 2007103216 A2 | 9/2007 | |
| WO | 2008017983 | 2/2008 | |
| WO | 2009106803 A2 | 9/2009 | |
| WO | 2009143169 A1 | 11/2009 | |
| WO | 2011069024 A1 | 6/2011 | |
| WO | 2011091070 A2 | 7/2011 | |
| WO | 2013116549 A1 | 8/2013 | |
| WO | 2013119423 A1 | 8/2013 | |
| WO | 2014107675 | 7/2014 | |
| WO | 2014121097 A1 | 8/2014 | |
| WO | 2014124152 A2 | 8/2014 | |
| WO | 2016011205 | 1/2016 | |
| WO | WO-2022235903 A1 * | 11/2022 | ........... G01N 23/203 |

OTHER PUBLICATIONS

International Search Report for PCT/US2015/040653, Dec. 16, 2015.
International Search Report for PCT/US14/56652, Apr. 27, 2015.
International Search Report for PCT/US14/14198, May 16, 2014.
International Preliminary Report on Patentability for PCT/US2014/014198, Aug. 4, 2015.
International Search Report for PCT/US11/21758; Jul. 7, 2011, Rapiscan Systems Inc.
International Preliminary Report on Patentability for PCT/US11/21758, Jul. 7, 2011.
Written Opinion on Patentability for PCT/US11/21758; Jul. 7, 2011; Rapiscan Systems.
Molchanov P A et al: 'Nanosecond gated optical sensors for ocean optic applications' Sensors Applications Symposium, 2006. Proceedings of the 2006 IEEE Houston, Texas, USA Feb. 7-9, 2006, Piscataway, NJ, USA, IEEE, Feb. 7, 2006 (Feb. 7, 2006), pp. 147-150, XP010917671 ISBN: 978-0-7803-9580-0.
"Mobile X-Ray Inspection Systems" Internet citation Feb. 12, 2007, pp. 1-2, XP007911046 Retrieved from the Internet: URL:http://web.archive.org/web/20070212000928/http://www.bombdetection.co-m/cat.sub.--details.php?catid=20> [retrieved on Jan. 6, 2010].
International Search Report for PCT/GB09/00575, Apr. 7, 2010.
International Search Report for PCT/GB2009/000497, Jan. 22, 2010.
Smith C. R et al: 'Application of 450 kV computed tomography to engine blocks with steel liners' Materials Evaluation vol. 65, No. 5, 2007, pp. 458-461, XP055108238.
International Search Report for PCT/US13/23676, Jun. 28, 2013.
International Search Report for PCT/US13/24191, Rapiscan Systems Inc., mailed on Jun. 25, 2013.
International Search Report for PCT/US2014/010370, May 13, 2014.
International Search Report for PCT/US10/58809; Rapiscan Systems Inc.; Apr. 19, 2011.
International Search Report for PCT/US2014/015126, May 27, 2014.
Written Opinion of the International Searching Authority for PCT/US2014/015126, May 27, 2014.
International Search Report for PCT/US2012/054110, Dec. 24, 2012.

* cited by examiner

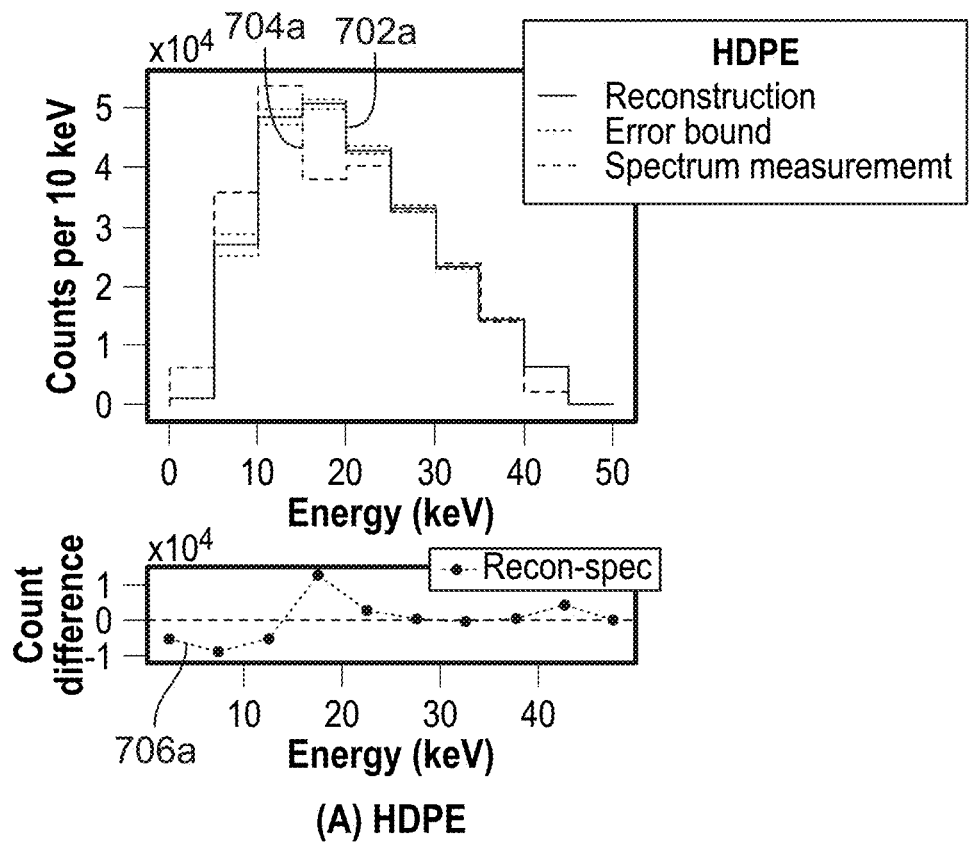
(A) HDPE
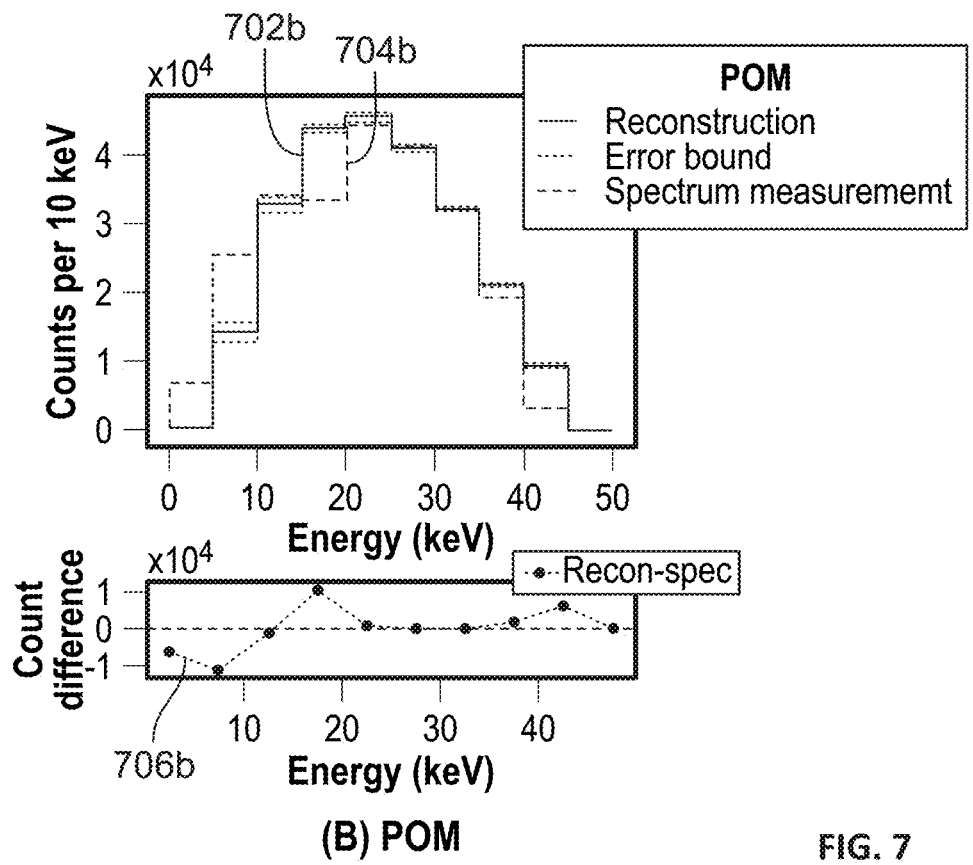
(B) POM
FIG. 7

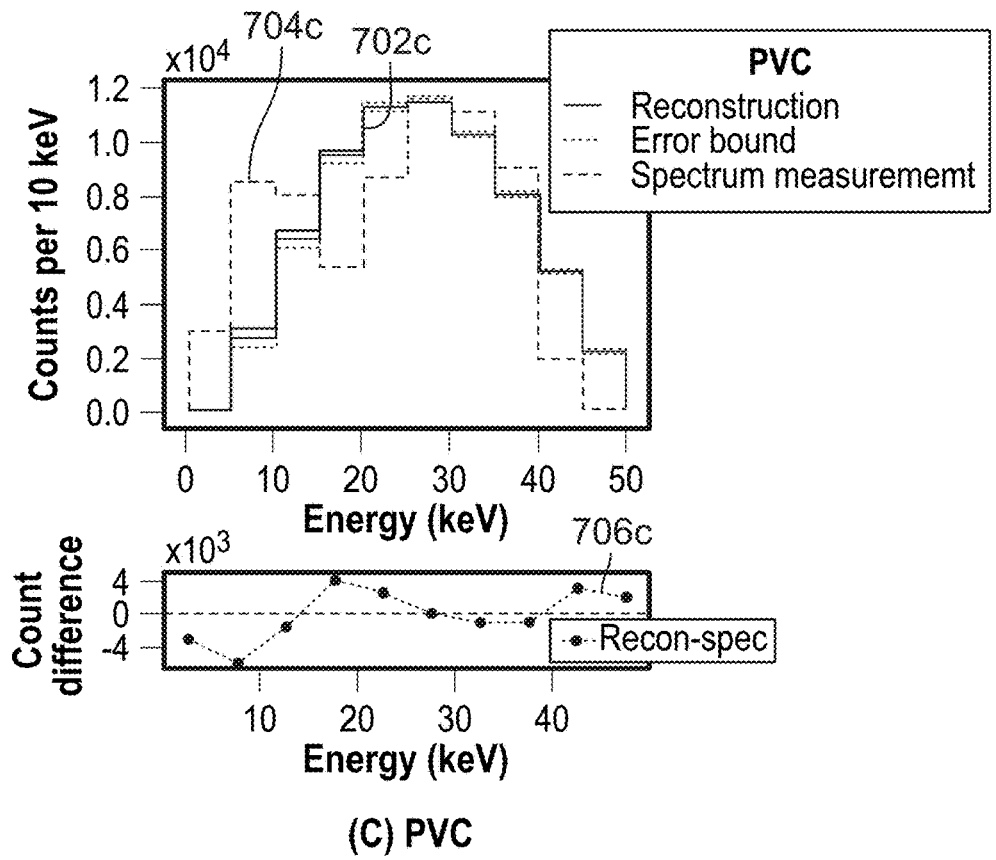
(C) PVC
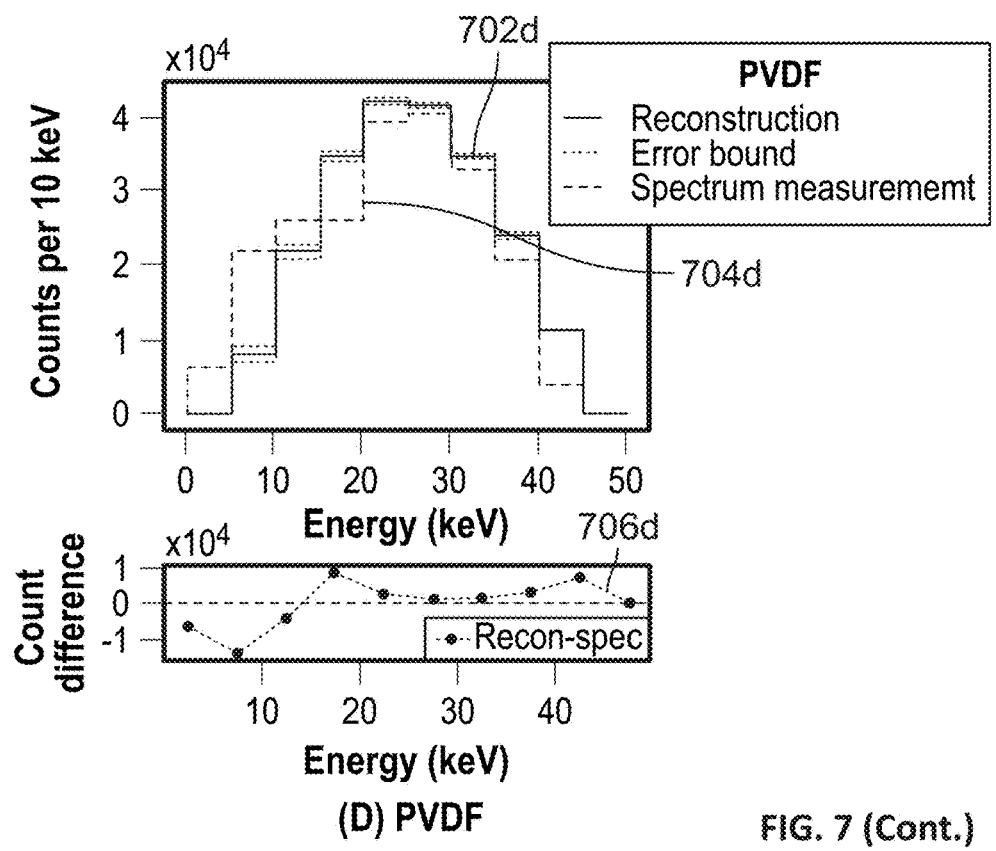
(D) PVDF
FIG. 7 (Cont.)

SYSTEMS AND A METHOD OF IMPROVED MATERIAL CLASSIFICATION USING ENERGY-INTEGRATED BACKSCATTER DETECTORS

CROSS-REFERENCE

The present specification relies upon U.S. Patent Provisional Application No. 63/365,103, titled "Systems and a Method of Improved Material Classification Using Energy-Integrated Backscatter Detectors", and filed on May 20, 2022, for priority. The above-mentioned application is herein incorporated by reference in its entirety.

FIELD

The present specification relates generally to X-ray scanning systems. More specifically, the present specification describes systems and methods for improved material classification using backscatter X-ray inspection systems operated in energy-integration mode.

BACKGROUND

Images produced by backscatter inspection systems are photographic in nature. When viewed by trained operators, they can be used to detect threats based on their shape and brightness within the images. There are two broad types of material identification: organic materials, which appear white or light in the image (due to many X-rays being scattered) and inorganic materials which appear dark (due to fewer X-rays being scattered). This contrast between materials allows threats to be detected based on their shape. However, it is not possible to further classify the materials from which the objects are made. For example, FIG. 1A shows a backscatter image 1002 of six different organic materials/objects that correspond to images/objects shown in a photographic image 1004. Despite all of the organic materials or objects being very different—ranging from an apple to a bag of C4 explosive simulant, all of the materials/objects appear at the same brightness in the backscatter image 1002. Those that are similar in shape, for example the bag of sugar and the bag of C4 simulant, are indistinguishable. As a result, if any organic material of a suspicious shape is seen in an image, then it is flagged as a potential security alert, resulting in a large number of false positive detection alarms.

Typical backscatter detectors use inorganic scintillator phosphors with decay times in the order of microseconds ($\mu s$). The optical signal generated through the scintillation process is converted to an electrical signal through a photodiode or PMT. The slow intrinsic decay time of the phosphor is much greater than the typical temporal space between successive interacting X-rays. Therefore, the above approach of energy detection is efficient when the total scintillation signal from many interacting X-rays is integrated into a single measurement. This single measurement reflects the total "intensity" of the beam that has scattered off the object under inspection. The detection mode wherein the single energy measurement is collected from multiple interacting X-rays, is referred to as "Energy Integrating" as the intensity of each interacting X-ray (proportional to its energy) is summed by a processor configured to process the detected signals, to provide a total signal value. In the approach of "Energy Integration", all information pertaining to the distribution of X-ray energies within the polychromatic beam is lost. Consequently, it is impossible to infer any properties of the backscattering material beyond that of "high organic content" and "low organic content". Backscatter inspections systems often use X-ray detectors known as energy-integrating detectors. They are inorganic or plastic scintillator detectors made from materials such as gadolinium oxysulphide (GadOx), polyvinyl toluene (PVT) or calcium tungstate. Energy-integrating detectors are used due to their high efficiency, fast response times, low cost, environmental adaptability and ability to be manufactured into large sizes (backscatter detector panels can cover several m 2 of detection area).

Energy-integrating detectors, while having the many advantages described above, are also the main barrier to improving material identification in backscatter inspection systems. The energy spectrum of the scattered beam contains significantly more information pertaining to the scattering material type, compared with the intensity alone, which suggests that spectral information could be used to discriminate between organic materials. However, this information is lost when energy integrating detectors are used.

A non-energy integrating detector can be used to determine additional information relating to the constituents of an attenuating material. Non-energy integrating detectors, or fast-decaying high-density phosphor detectors, are also referred to as "energy counting" detectors. In backscatter imaging detector technologies, this would correspond to phosphors (or other scintillating materials) with decay times that are on the order of nanoseconds (ns) or less, such that for an anticipated backscatter X-ray flux, the time between interacting X-rays is greater than the intrinsic decay time of the scintillator. In this case, where the time between interacting X-rays is greater than the intrinsic decay time of the scintillator, it is possible to measure individual X-ray interactions and parameters including pulse height, or total intensity of each X-ray signal, and obtain a measure of the energy of the X-ray. In building up a spectrum of the backscatter X-ray energies, it is possible to characterize the composition of the backscattering material to a higher degree than with an energy-integrating detector. Therefore, in one embodiment, a non-energy integrating detector is a detector with an intrinsic decay time that is less than the time between a first X-ray and a second X-ray interacting with the detector.

Previous studies have demonstrated improved material identification using an X-ray spectrometer with a solid-state detector (semiconductor radiation detector) such as, for example, a cadmium telluride (CdTe) detector. Energy-resolving detectors or solid-state detectors (also called Semiconductor Radiation Detectors) are radiation detectors in which a semiconductor material such as a silicon or germanium crystal constitutes the detecting medium. One such device consists of a p-n junction across which a pulse of current develops when a particle of ionizing radiation traverses it, or wherein the absorption of ionizing radiation generates pairs of charge carriers (electrons and electron-deficient sites referred to as "holes") in a block of semiconducting material. The migration of these carriers under the influence of a voltage maintained between the opposite faces of the block constitutes a pulse of current. The pulses created in this way are amplified, recorded, and analyzed to determine the energy, number, or identity of the incident-charged particles. The magnitude of the amplified pulse is directly proportional to the energy deposited into/absorbed by the material. As photoelectric absorption is the predominant interaction mechanism for an interacting X-ray in the low keV (<100 keV) energy regime in materials of this type, the energy information contained in the pulse magnitude far outweighs the contribution from Compton scatter events which contribute a range of signal values—akin to the response observed in integrating plastic scintillator materials typically used for backscatter imaging systems. Examples of solid-state detectors include Germanium, Cadmium Telluride, Cadmium Zinc telluride.

However, using solid state detectors in backscatter inspection systems is challenging as current manufacturing methods limit crystal sizes on the order of $mm^2$ and are very expensive. In other words, it would be prohibitively expensive for the raw semi-conductor material to provide sufficient coverage. Also, integration to data acquisition system drives significant additional cost for multi-channel readouts (versus large area phosphor and single PMT/SiPM). Additionally, some detectors, such as Germanium, require cooling to cryogenic temperatures in order to reduce thermal noise contributions adding to both complexity and cost.

Accordingly, there is a need for backscatter inspection systems that use energy-integrating detectors to retain efficiency and reduce cost, but are also configured to obtain spectral information for improved material identification capabilities.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses an X-ray inspection system configured to scan an object, comprising: an X-ray source configured to emit a beam of X-rays toward the object, wherein the object comprises one or more materials; a detector panel positioned to generate scan data corresponding to X-rays scattered back from the object, wherein the detector panel comprises: an array of 'm' spatially distributed and independent detector assemblies, wherein each of the 'm' spatially distributed and independent detector assemblies is configured to detect a range of energies; and an array of 'n' filters, wherein each of the 'n' filters has a thickness and is positioned over one of the 'm' spatially distributed and independent detector assemblies, wherein 'n' is based on a required number of energy bins in the range of detected energies, and wherein each of the n filters has a different thickness and each different thickness has a minimum value, wherein the minimum value is a smallest thickness required to distinguish spectral features between similar, but not identical, organic material types; and a computing device including a processor and a memory coupled to the processor, wherein the memory stores a plurality of programmatic code which, when executed by the processor, causes the processor to: acquire the scan data; reconstruct an energy spectrum from the acquired scan data, wherein the reconstructed energy spectrum includes the required number of energy bins; extract one or more features of the reconstructed energy spectrum using the energy bins; identify one or more unique characteristics related to the one or more materials based on the one or more features; and classify the material as being illicit or benign based on the one or more characteristics.

Optionally, the detector panel is configured to operate in an energy-integration mode.

Optionally, m=n.

Optionally, the required number of energy bins is based on a required level of separation between different energy levels from the predefined range of energies for classification of material of the object.

Optionally, prior to generating the scan data, each of the 'n' filters is adapted to be removed from being positioned in front of the corresponding 'm' spatially distributed and independent detector assembly in order for the detector panel to generate scan data that is unattenuated.

Optionally, the plurality of programmatic code, when executed by the processor, further causes the processor to reconstruct the energy spectrum by configuring an energy spectrum reconstruction problem as an inverse problem.

Optionally, the one or more features comprise at least one of: a peak intensity value and location in the reconstructed energy spectrum, a first intensity signal on a first side of the peak intensity value in the reconstructed energy spectrum, a second intensity signal on a second side of the peak intensity value, a first gradient of the reconstructed energy spectrum on the first side of the peak intensity value, or a second gradient of the reconstructed energy spectrum on the second side of the peak intensity value. Optionally, the one or more unique characteristics comprise at least one of: a relationship between the first intensity signal and effective atomic number, a relationship between the second intensity signal and density, a ratio between the first intensity signal and the second intensity signal, or a comparative difference between the first gradient and the second gradient.

Optionally, the plurality of programmatic code, when executed by the processor, further causes the processor to correct relative locations of the spatially distributed, independent detector assemblies while reconstructing the energy spectrum.

Optionally, the array of 'm' detector assemblies comprises different types of detector materials to enhance detection of the backscattered X-rays based on an overlap of the scan data and presence of absorption edges within the detector materials.

The present specification also discloses a method of classifying a material as being illicit or benign, the method comprising: operating an X-ray backscatter inspection system in energy-integration mode, wherein the X-ray backscatter inspection system comprises: an X-ray source configured to direct a beam of X-rays onto a material; and a detector panel positioned to generate scan data corresponding to X-rays scattered back from the material, wherein the detector panel has an array of 'm' spatially distributed and independent detector assemblies, wherein an array of 'n' filters of unique thicknesses is positioned over the 'm' detector assemblies, and wherein 'n' is based on a required number of energy bins from a range of energies in the scan data; acquiring the scan data; reconstructing an energy spectrum from the acquired attenuated scan data, wherein the reconstructed energy spectrum includes the required number of energy bins; extracting one or more features of the reconstructed energy spectrum using the energy bins; based on the one or more features, identifying one or more unique characteristics related to the material; and based on the one or more characteristics, classifying the material as being illicit or benign.

Optionally, m=n.

Optionally, the required number of energy bins is based on a required level of separation between different energy levels from the range of energies for classification of material of the object.

Optionally, prior to generating the scan data, the array of 'n' filters is removed in order for the detector panel to generate unattenuated scan data.

Optionally, the energy spectrum is reconstructed by formulating and solving the energy spectrum reconstruction problem as an inverse problem.

Optionally, the one or more features comprise at least one of: a peak intensity value and location in the reconstructed energy spectrum, a first intensity signal on a first side of the peak intensity value in the reconstructed energy spectrum, a second intensity signal on a second side of the peak intensity value, a first gradient of the reconstructed energy spectrum on the first side of the peak intensity value, or a second gradient of the reconstructed energy spectrum on the second side of the peak intensity value. Optionally, the one or more unique characteristics comprise at least one of: a relationship between the first intensity signal and effective atomic number, a relationship between the second intensity signal and density, a ratio between the first intensity signal and the second intensity signal, or a comparative difference between the first gradient and the second gradient.

Optionally, an impact of the relative location of the spatially distributed, independent detector assemblies is corrected for while reconstructing the energy spectrum.

Optionally, the array of 'm' detector assemblies comprises different types of detector materials to enhance detection of the backscattered X-rays based on an overlap of the attenuated scan data and presence of absorption edges within the detector materials.

The present specification also discloses an X-ray backscatter inspection system, comprising: an X-ray source configured to direct a beam of X-rays onto a material, wherein the beam has a flying spot configuration; a detector panel positioned to generate scan data corresponding to X-rays scattered back from the material, wherein the detector panel has an array of a plurality of spatially distributed and independent detector assemblies and comprises a plurality of filters, wherein at least one of the plurality of filters is positioned over each of the plurality of detector assemblies, and wherein each of the plurality of filters has a unique thickness that is based on a required number of energy bins in a range of energies of the generated scan data; and a computing device including a processor and a memory coupled to the processor, wherein the memory stores a plurality of programmatic code which, when executed by the processor, causes the processor to: acquire the scan data; reconstruct an energy spectrum from the acquired scan data, wherein the reconstructed energy spectrum includes the required number of energy bins; extract one or more features of the reconstructed energy spectrum using the energy bins; based on the one or more features, identify one or more unique characteristics related to the material; and based on the one or more characteristics, classify the material as being illicit or not illicit.

The present specification also discloses an X-ray inspection system, comprising: an X-ray source configured to fire a beam of X-rays onto a material; a detector panel positioned to generate attenuated scan data corresponding to X-rays scattered back from the material, wherein the detector panel has an array of 'm' spatially distributed and independent detector assemblies, wherein an array of 'n' filters are positioned over the 'm' detector assemblies, and wherein the detector panel is operated in an energy-integration mode; and a computing device including a processor and a memory coupled to the processor, wherein the memory stores a plurality of programmatic code which, when executed by the processor, causes the processor to: acquire the attenuated scan data; reconstruct an energy spectrum from the acquired attenuated scan data; extract one or more features of the reconstructed energy spectrum; based on the one or more features, identify one or more unique characteristics related to the material; and based on the one or more characteristics, classify the material as being illicit or benign.

Optionally, each of the n filters has a unique thicknesses and each unique thickness is selected within a range such that each of the unique thicknesses have a minimum value of 'n' that is required to measure a spectrum of the X-rays backscattered from the object to distinguish features between similar organic material types from the one or more materials. Optionally, each of the n filters has a different thickness and each different thickness has a minimum value, wherein the minimum value is a smallest thickness required to distinguish spectral features between similar, but not identical, organic material types.

Optionally, m=n.

Optionally, 'n' is chosen so as to provide a suitable range of detector response measurements needed for a required level of material classification.

Optionally, each of the 'n' filters has a different thickness.

Optionally, a thickness of each of the 'n' filters is chosen so as to provide a necessary distribution of intensity measurements needed for a required level of material classification.

Optionally, prior to generating the attenuated scan data, the array of 'n' filters are removed in order for the detector panel to generate unattenuated scan.

Optionally, the energy spectrum is reconstructed by formulating and solving the energy spectrum reconstruction problem as an inverse problem.

Optionally, the one or more features comprise at least one of: a peak intensity value and location in the reconstructed energy spectrum, a first intensity signal on a first side of the peak intensity value in the reconstructed energy spectrum, a second intensity signal on a second side of the peak intensity value, a first gradient of the reconstructed energy spectrum on the first side of the peak intensity value, or a second gradient of the reconstructed energy spectrum on the second side of the peak intensity value.

Optionally, the one or more unique characteristics comprise at least one of: a relationship between the first intensity signal and effective atomic number, a relationship between the second intensity signal and density, a ratio between the first and second intensity signals, or a comparative difference between the first and second gradients.

Optionally, an impact of the relative location of the spatially distributed, independent detector assemblies is corrected for while reconstructing the energy spectrum.

Optionally, the array of 'm' detector assemblies comprises different types of detector materials to enhance detection of the backscattered X-rays based on an overlap of the attenuated scan data and presence of absorption edges within the detector materials.

The present specification also discloses a method of classifying a material as being illicit or benign, the method comprising: operating an X-ray backscatter inspection system in energy-integration mode, wherein the X-ray backscatter inspection system comprises: an X-ray source configured to fire a beam of X-rays onto a material; and a detector panel positioned to generate attenuated scan data corresponding to X-rays scattered back from the material, wherein the detector panel has an array of 'm' spatially distributed and independent detector assemblies, wherein an array of 'n' filters are positioned over the 'm' detector assemblies, and wherein the detector panel is operated in energy-integration mode; acquiring the attenuated scan data; reconstructing an energy spectrum from the acquired attenuated scan data; extracting one or more features of the reconstructed energy spectrum; based on the one or more features, identifying one or more unique characteristics related to the material; and based on the one or more characteristics, classifying the material as being illicit or benign.

Optionally, m=n.

Optionally, 'n' is chosen so as to provide a suitable range of measurements needed for a required level of material classification.

Optionally, each of the 'n' filters has a different thickness.

Optionally, a thickness of each of the 'n' filters is chosen so as to provide a necessary distribution of intensity measurements needed for a required level of material classification.

Optionally, prior to generating the attenuated scan data, the array of 'n' filters are removed in order for the detector panel to generate unattenuated scan.

Optionally, the energy spectrum is reconstructed by formulating and solving the energy spectrum reconstruction problem as an inverse problem.

Optionally, the one or more features comprise at least one of: a peak intensity value and location in the reconstructed energy spectrum, a first intensity signal on a first side of the peak intensity value in the reconstructed energy spectrum, a second intensity signal on a second side of the peak intensity value, a first gradient of the reconstructed energy spectrum on the first side of the peak intensity value, or a second gradient of the reconstructed energy spectrum on the second side of the peak intensity value.

Optionally, the one or more unique characteristics comprise at least one of: a relationship between the first intensity signal and effective atomic number, a relationship between the second intensity signal and density, a ratio between the first and second intensity signals, or a comparative difference between the first and second gradients.

Optionally, an impact of the relative location of the spatially distributed, independent detector assemblies is corrected for while reconstructing the energy spectrum.

Optionally, the array of 'm' detector assemblies comprises different types of detector materials to enhance detection of the backscattered X-rays based on an overlap of the attenuated scan data and presence of absorption edges within the detector materials.

The present specification also discloses an X-ray backscatter inspection system, comprising: an X-ray source configured to fire a beam of X-rays onto a material, wherein the beam has a flying spot configuration; a detector panel positioned to generate attenuated scan data corresponding to X-rays scattered back from the material, wherein the detector panel has an array of a plurality of spatially distributed and independent detector assemblies, wherein a filter is positioned over each of the plurality of detector assemblies, and wherein the detector panel is operated in energy-integration mode; and a computing device including a processor and a memory coupled to the processor, wherein the memory stores a plurality of programmatic code which, when executed by the processor, causes the processor to: acquire the attenuated scan data; reconstruct an energy spectrum from the acquired attenuated scan data; extract one or more features of the reconstructed energy spectrum; based on the one or more features, identify one or more unique characteristics related to the material; and based on the one or more characteristics, classify the material as being illicit or benign.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1A:
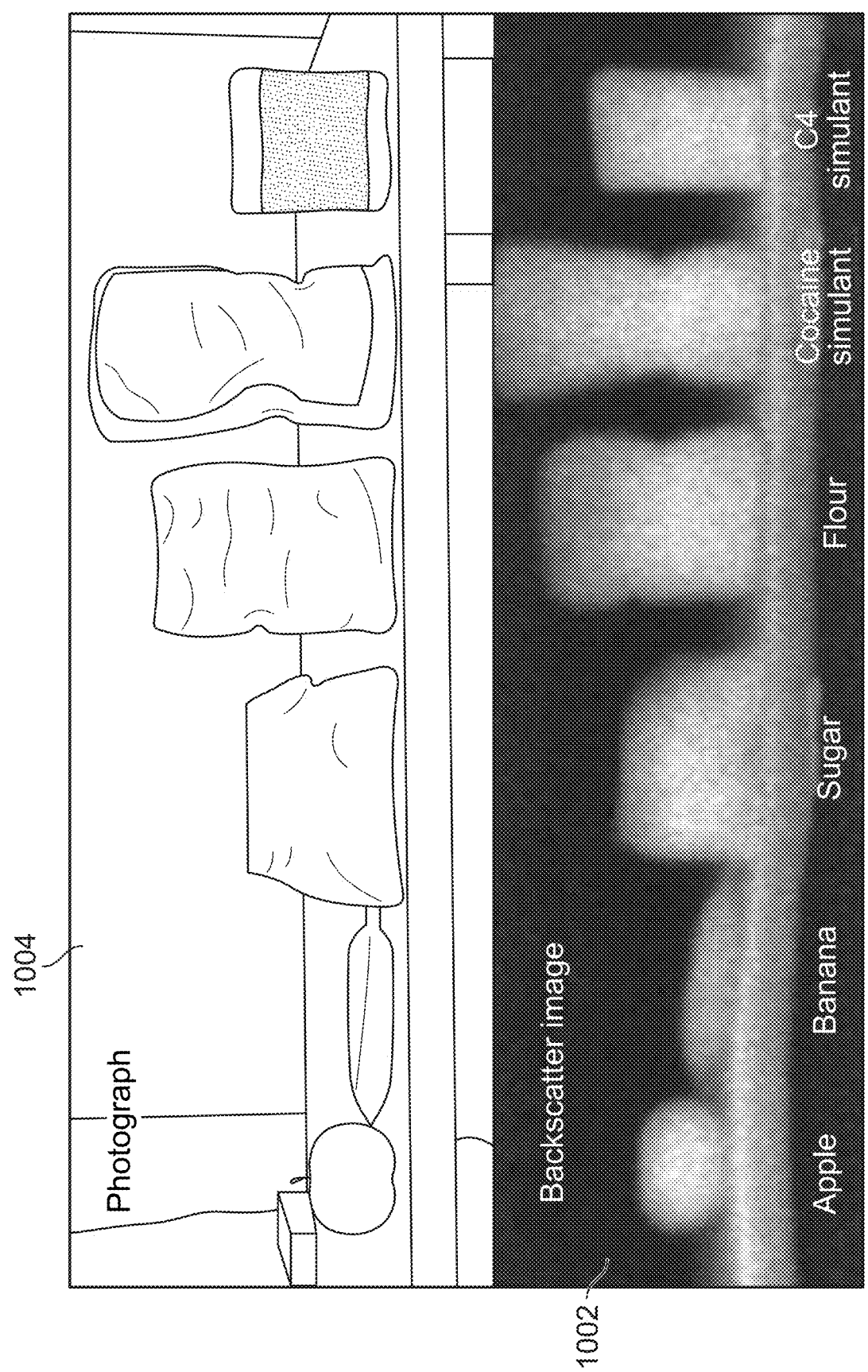
FIG. 1A is a backscatter scan image showing six different organic materials or objects.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or causes the CPU of the computing device to perform various functions and processes. In alternate embodiments, hardwired circuitry may be used in place of, or in combination with, software instructions for implementation of the processes of systems and methods described in this application. Thus, the systems and methods described are not limited to any specific combination of hardware and software.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

In accordance with some aspects, in order to improve material identification in X-ray backscatter imaging, the present specification is directed towards systems and methods of acquiring spectral information about the X-rays that are scattered during backscatter imaging. As is known to persons of ordinary skill in the art, spectral information cannot be acquired directly from the detectors of conventional backscatter scanning systems, as these detectors are energy integrating. Therefore, the present specification is directed towards acquiring spectral information from measurements of detector response using a plurality of detector filters and a method of spectrum reconstruction. Stated differently, the present specification is directed towards using targeted filtered detector response measurements along with spectrum reconstruction algorithms/calculations configured to transform energy-integrating detectors into material discriminating detectors.

Figure 1B:
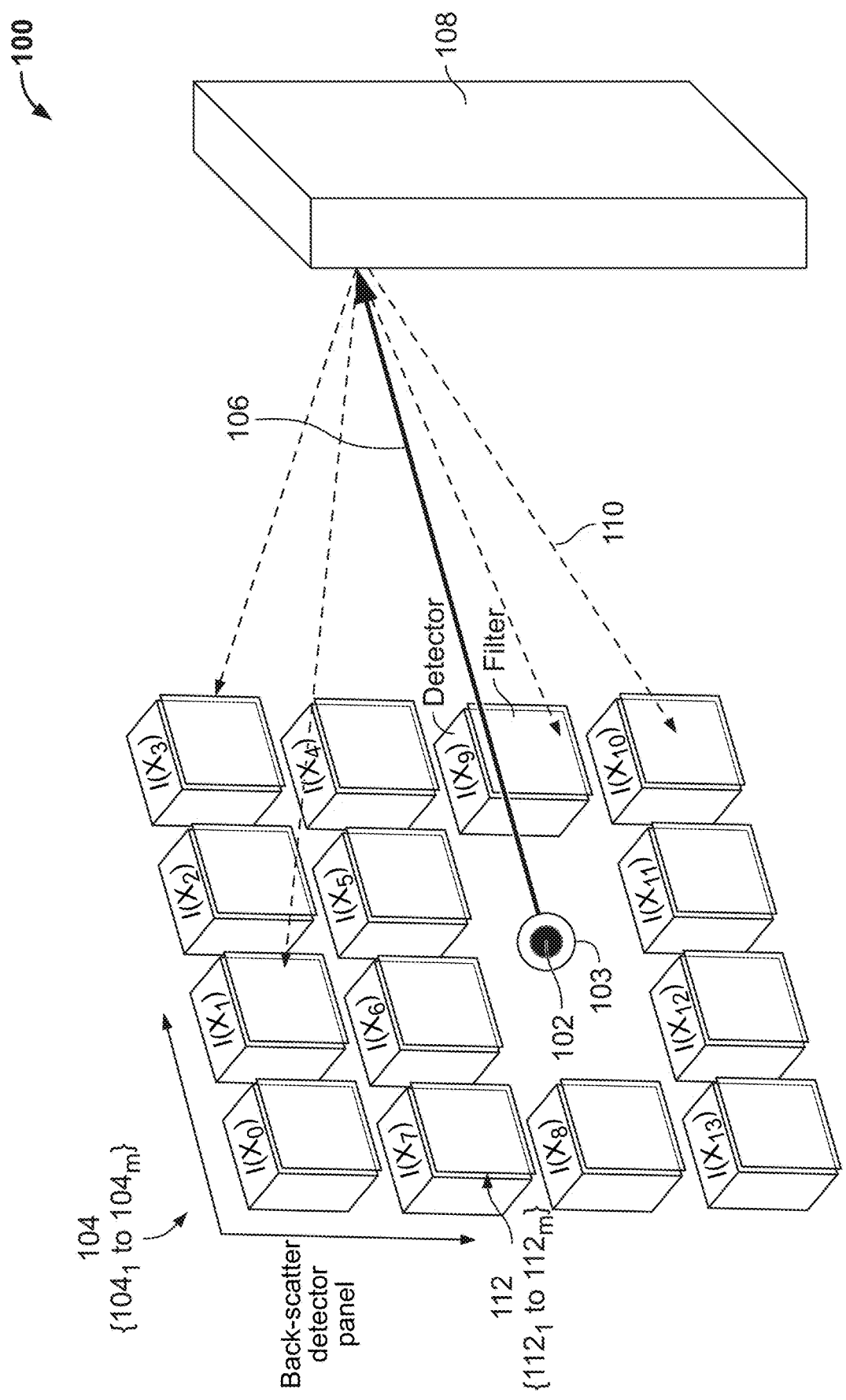
FIG. 1B is a perspective block diagram of an architecture of a low-energy backscatter inspection system configured to acquire spectral information for improved material classification while operating backscatter detectors in energy-integration mode, in accordance with some embodiments of the present specification.

Backscatter Inspection System Configured to Acquire Spectral Information for Materials Classification FIG. 1B is a block diagram illustration of an architecture of a low-energy backscatter inspection system 100 configured to acquire spectral information for improved material classification while operating backscatter detectors in energy-integration mode, in accordance with some embodiments of the present specification. The system 100 comprises an X-ray source 102 that is collimated using a rotating chopper wheel or hoop 103 in order to generate a low-energy beam 106 of X-rays. The X-ray beam 106 is configured to impinge on an object 108 to be scanned whereby the object 108 scatters at least a portion of the X-ray beam 106. Beams 110 of X-rays, scattered in the backward direction (back propagation) from the object 108, are collected and processed by a panel of detectors 104 that is positioned on the same side of the object 108 as the X-ray source 102. In some embodiments, the X-ray beam 106 has a flying spot configuration. In various embodiments, the X-ray source 102 is an X-ray tube providing energy output in a range of 140 keV to 160 keV.

In accordance with aspects of the present specification, the detector panel 104 is configured as an array of 'm' spatially distributed, independent detector assemblies or modules $104_1$ to $104_m$ each of which is further configured to sample a subset of the backscattered X-ray data. Each detector assembly is independent of the other, as each assembly is configured with a scintillator and photodiode. Each detector assembly individually receives and processes backscatter signals, each detector assembly performs the detection separately from each other detector assembly, and each detector assembly is non-interacting with the other detector assemblies. Therefore, the detector assemblies are discrete or separate whole units that act in isolation from any other unit. Further, each detector assembly is identical to the other detector assemblies, with the exception of their locations or placement in detector panel 104, wherein each detector assembly is a different location. The signals collected by each photodiode within each detector assembly are further transferred to integrating ASICs which integrate different white light intensities. Additionally, in some embodiments, a filter 112 is positioned in front of each of the independent detector assemblies $104_1$ to $104_m$. Thus, in some embodiments, the detector panel 104 includes an array of 'm' filters $112_1$ to $112_m$. In embodiments, each of the 'm' filters has a different thickness. Stated differently, filters of different thicknesses are placed over each independent detector assembly in order to acquire multiple filtered detector response measurements simultaneously. The filters resolve the integrated energy collected by the detector panel 104 into energy bins. In other words, a required number of energy bins determine the variation in the thicknesses of the filters. Thus, 'm' filters having different thicknesses are placed across the detector panel array 104 and the detector response is recorded for each of the 'm' independent detector assemblies. This enables 'm' intensity measurements to be acquired simultaneously and allow reconstruction of a 'm' bin energy spectrum. Thus, in some embodiments, the number of filters is equal to the number of independent detector assemblies. However, in alternate embodiments, the detector panel 104 of 'm' spatially distributed, independent detector assemblies or modules may include an array of 'n' filters, wherein m n. In various embodiments, the thicknesses of the filters may vary from 300 micrometers to 10 millimeters depending upon the filter material and the range of backscattered X-rays.

In various embodiments, the number of attenuation filters of differing thicknesses is chosen to provide a suitable range of response measurements needed to reduce the phase space for material classification. Thus, if the spectrum is reconstructed to an infinite degree using an infinite number of filters, elemental specific identification could be performed. Everything up to this point will provide a reduced phase space within which a lower degree of separation is achievable. It should be appreciated that the filters (whether equal or not equal to the number of independent detector assemblies) need to differ in thickness in order to provide sufficient separation between the data captured on either side of the energy at which the signal falls to a minimum level. This defines the bin separation and is chosen based on the required level of separation needed for the material classification. Stated differently, the thicknesses of the filters need to differ enough to separate the data captured into necessary bins for determining a difference in the spectral structure for analysis. The thickness separation/difference will depend upon the number of bins into which the captured data is required to be separated. The larger the number of bins, the smaller the difference in thicknesses between each filter. Thus, in various embodiments, the thicknesses of each attenuation filter is chosen so as to provide the necessary distribution of intensity measurements needed to reduce the phase space for material classification.

In some embodiments, a required level of separation (needed for material classification) is achieved with at least two filters as long as their thicknesses are chosen to provide a separation of data points on either side of the peak distribution (since a ratio of data points in a first bin to the left and in a second bin to the right of the peak give a measurement unique to a material class). If the thicknesses of the at least two filters are closer together, sufficient data may not be gathered on either side of the peak, or in fact, the higher-energy or lower-energy data may become corrupted with signals from the other, effectively washing out the differences. It should be appreciated that higher number of filters used provide more spectral information, and hence more detail that can be potentially used for material classification. A minimum and maximum thickness of the filter is selected so that the backscatter signal through the selected thickness(es) or range of thicknesses can still be measured, since at a specific thickness and beyond the backscatter signal can be immeasurable. The maximum acceptable thickness depends on the backscatter intensities. The level of separation between the thicknesses of the filters is based on the frequency of the intervening materials (filters) within the range defined by the minimum and the maximum thicknesses, and has a direct impact on the level of spectral information that can be captured. Increasing the number of filters, after a point, will have no impact as the statistical error from one measurement from one filter of a first thickness encompasses the value that would be measured by another filter of a second thickness, where the second thickness is close to the first thickness. The overlap in the measurements by two filters of close levels of thicknesses depends on the intensity of the backscatter signal since Poisson statistics relates the error of the measured signal to the square root of signal intensity. As a result of the relation established in the Poisson statistics, the larger the backscatter intensity, post attenuation by the filters, the lower the percentage error and therefore the ability, with a higher frequency of filters, to measure more independent points in the spectrum reconstruction.

Where 'n' filters of unique thicknesses are used, each of the unique thicknesses is selected within a range so as to have a minimum value of 't' that is required to measure a spectrum of the X-rays backscattered from the object to distinguish features between similar organic material types in order to achieve at a higher level of material classification. In an example, if the range of useable filter thicknesses is 0 mm (minimum) to 10 mm (maximum), but only two filters of thickness 1 mm and 2 mm are used, the reconstructed spectra may not differentiate between two material types, since the value of the thicknesses of the two filters is close (difference is only 1 mm) within the entire available range (of 0 mm to 10 mm). As a result of the two filters being used having little difference in their thickness, the reconstruction of regions that are sensitive to material composition can be missed.

Higher-energy systems (such as, for example, cargo backscatter imaging systems using at least 151 keV X-rays (and preferably at least 225 keV X-rays) as compared to lower energy handheld backscatter imaging systems using 50-150 keV X-rays), where there is less signal in the lower keV regions and where more characteristic features of the scattering material are present, may require more than a single ratio of data points (in a first bin to the left and in a second bin to the right of the peak) in order to identify unique characteristics for separation. In such scenarios, the thicknesses of the filters are chosen so as to achieve more than a single ratio of data points. So, in some embodiments, additional filter thicknesses are required to probe additional areas of the spectrum for comparison, or a larger number of filters are required around one or more bins to provide more detailed structure, particularly when looking around areas of characteristic X-ray peaks. Therefore, in various embodiments, both the thicknesses of the filters and number of filters is variable in order to achieve the objectives of the present specification.

Also, the presence of filters of different thicknesses at different locations on a surface (of the detector panel 104) would not necessarily impact on the detector response measurements, provided the impact of distance (between the system 100 and a material/object under investigation) and interaction angle are accounted for—both of which are known quantities and would be included in calibration prior to scan data capture. In different embodiments, the relative positions of the filters may or may not have a pattern based on their thickness. In some embodiments, filters of different thickness are positioned randomly on the detector panel.

In accordance with some aspects of the present specification, detector panel 104 is operated in energy-integration mode where the time-integrated beam intensity is measured. In some embodiments, each of the array of 'm' independent detector assemblies 104$_1$ to 104$_m$ is connected to a suitable optical readout such as a PMT (photomultiplier tube) and signal processing unit that outputs detector responses to an image processing computing device. In embodiments, the computing device executes a plurality of programmatic instructions or code to mathematically reconstruct or calculate the energy spectrum by formulating and solving the energy reconstruction problem as an inverse problem.

In some embodiments, each of the array of 'm' independent detector assemblies $104_1$ to $104_m$ is a scintillation detector such as, but not limited to, NaI, BGO, LYSO (Lutetium-yttrium oxyorthosilicate), CsI, BaFCl, PVT (Polyvinyltoluene), $Gd_2O_2S$ (Gadolinium Oxysulphide or Gadox) and $CaWO_4$. In some embodiments, the array of independent detector assemblies or modules comprises a mix or a combination of two or more different scintillating materials—each with different X-ray response characteristic, in order to enhance detection of backscattered X-rays based on an overlap of attenuated signal and the presence of absorption edges within the detector materials.

In some embodiments, the filters are permanently attached to the detection panel 104. In alternate embodiments, the filters are a maneuverable installation so that the filters may be removed to acquire unattenuated backscatter scans and subsequently placed over the detector panel 104 to acquire attenuated backscatter scans for material classification. Thus, in some embodiments, the system 100 is configured to perform a normal first pass scan without filters (that is, unfiltered or unattenuated detectors) and a second pass scan is subsequently performed with filters (that is, filtered or attenuated detectors) to further determine the composition of the objects scan in the first pass scan. It should be appreciated that an advantage of a two-pass scan is that the first pass scan provides a more "typical" backscatter image with no performance reduction resulting from a portion of the detector array being utilized for the purposes of material classification. Performing the second pass scan in conjunction with the first pass scan aids improved throughput due to reduced false alarms. The use of two-pass measurement, wherein the first pass scan is performed without the use of filters and the second pass scan is performed with the use of filters, is optional. In some embodiments, primary scanning using first-pass measurement is utilized, and the second-pass measurement is used as a secondary tool if a potential threat or something of concern is identified from the primary scanning.

In embodiments, the system 100 is operated to perform one or more scans of one or more known materials in order to calibrate the backscatter scan data. In embodiments, a distance between the system 100 and a material/object under investigation is measured simultaneously while scanning, such that a dose correction factor can be applied for determining an absolute measurement of the material configuration. Stated differently, if there is no reference measurement for a known material at a specified distance, then all subsequent measurements are relative as opposed to absolute. A known measurement against which all future measurements is compared with is therefore required.

Vehicle and Cargo Inspection System

High vehicle throughput at ports and security checkpoints is required to avoid long delays. All X-ray backscatter scans must be performed quickly but without compromising detection accuracy. The result is that any vehicle that is flagged up as containing potential contraband material must be manually searched. Manual searches can take up to 2 hours per vehicle which can cause lengthy delays. Therefore, there is a need to reduce the number of false positive detections by improving material identification. The ability to characterize the measured backscatter signal into regions of concern versus no concern is of great use for cargo imaging solutions. Without needing to determine exact chemical composition, the ability to use several features of a backscattered X-ray signal to place the scattering material into a band of "explosive" or "contraband" materials would significantly aid in illicit material identification, particularly when either material type can be formed into any shape that resembles an inert/non contraband organic material such as fruit, for example.

Figure 2A:
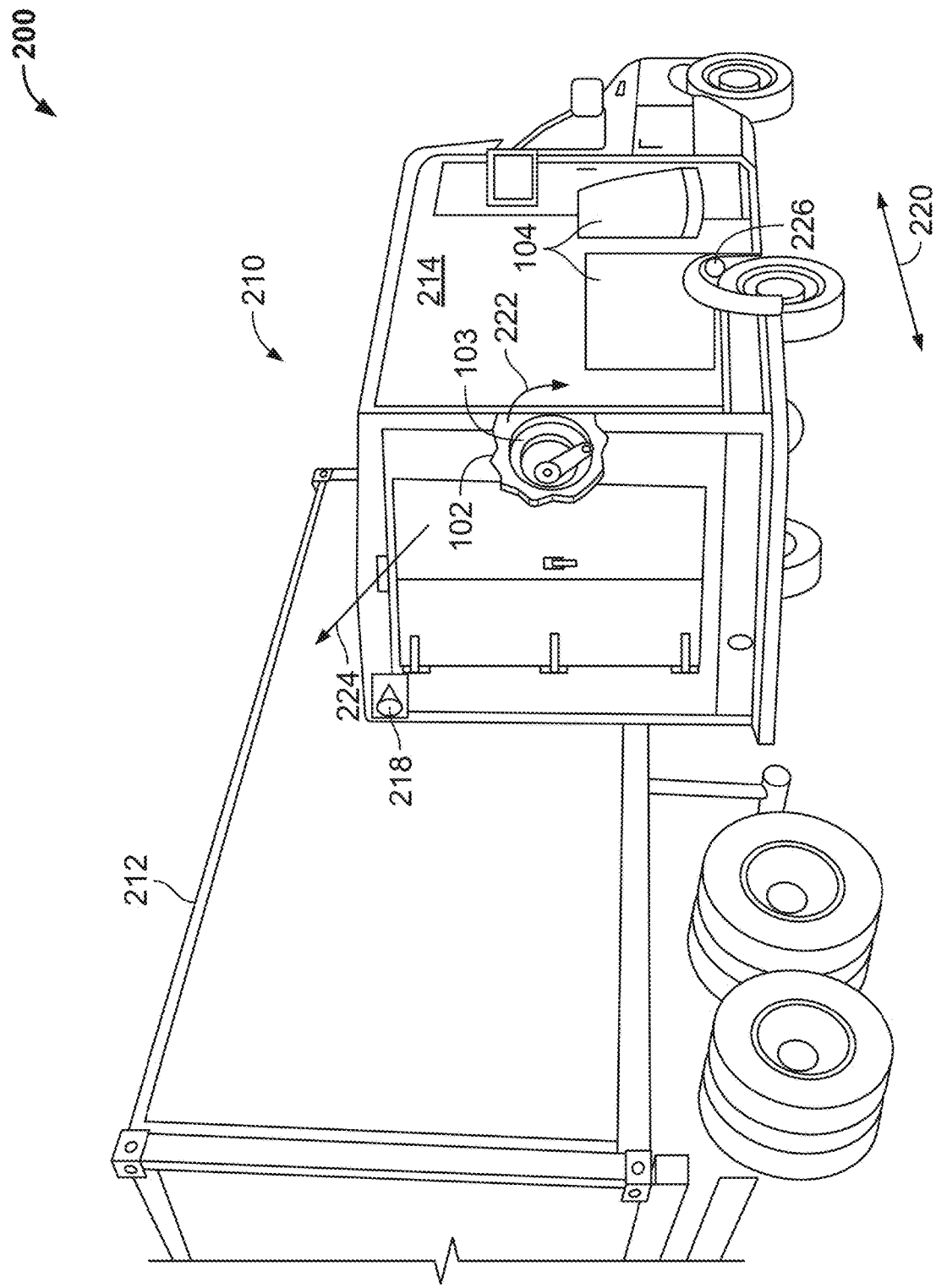
FIG. 2A is a break-away perspective view of an X-ray backscatter mobile cargo inspection system, in accordance with some embodiments of the present specification.
Figure 2B:
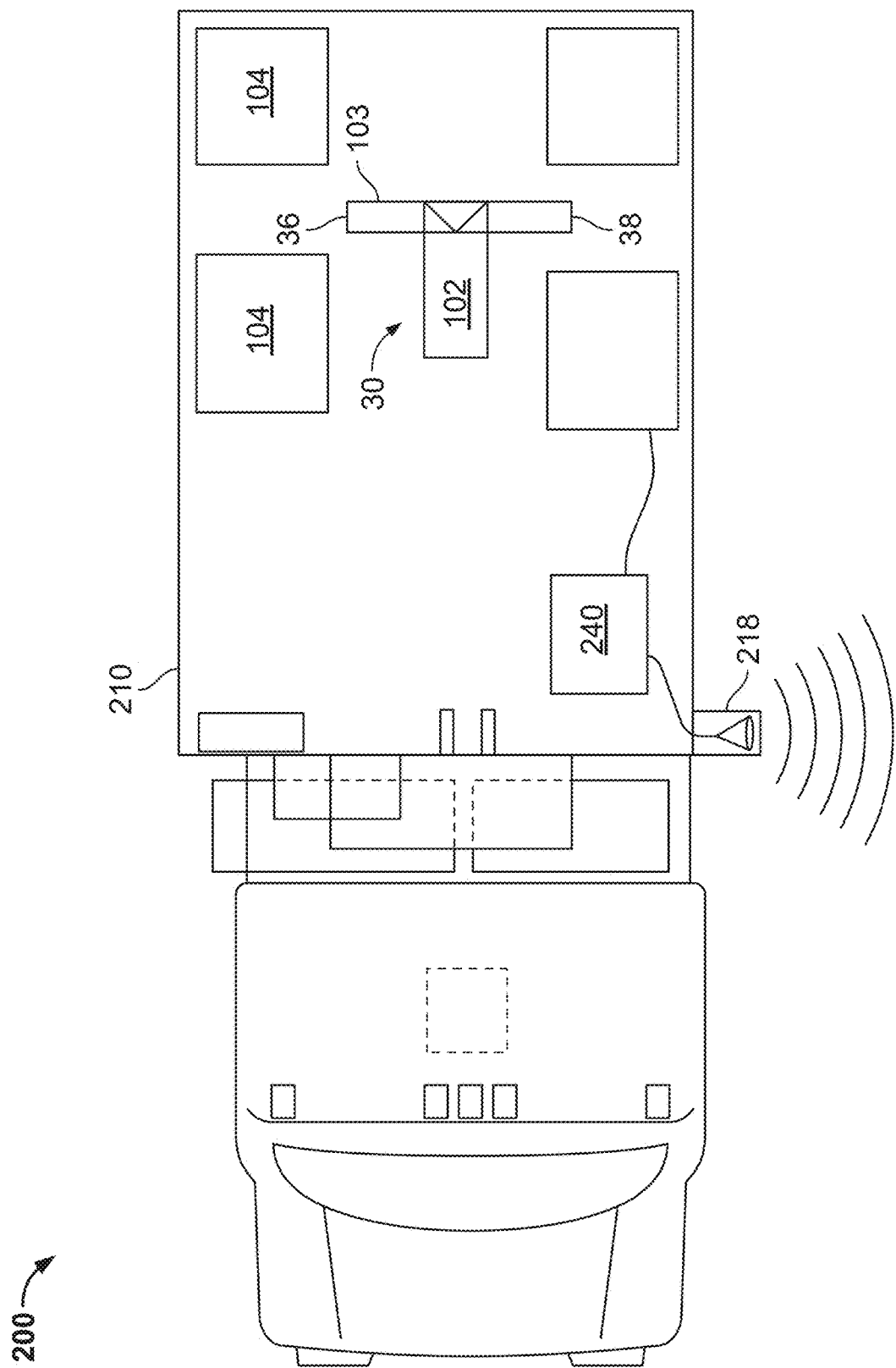
FIG. 2B is a schematic top-view representation of the inspection system shown in FIG. 2A, in accordance with some embodiments of the present specification.
Figure 2C:
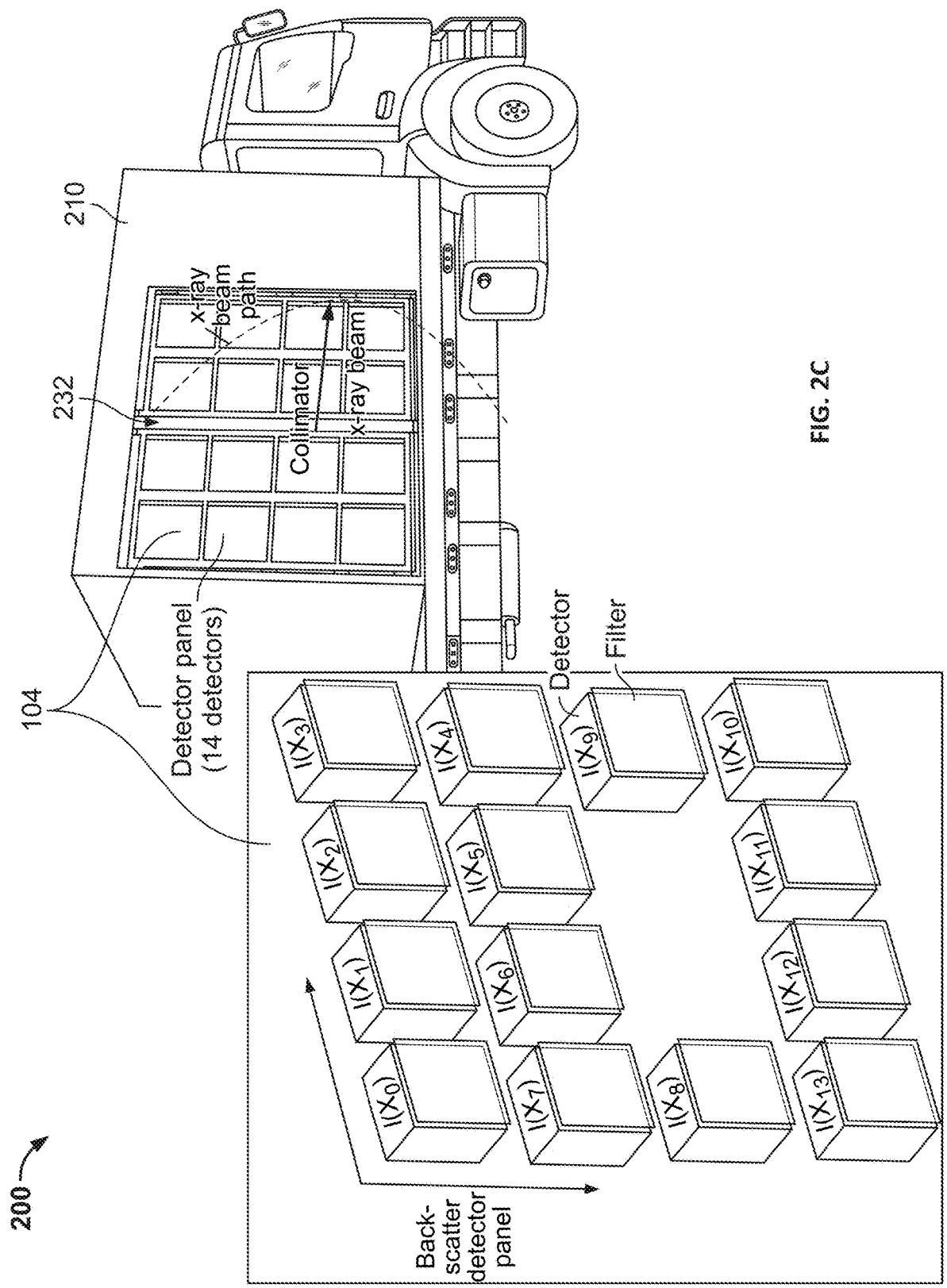
FIG. 2C is a side perspective view of the inspection system shown in FIG. 2A, in accordance with some embodiments of the present specification.

Therefore, in accordance with some embodiments, the low-energy backscatter imaging system 100 is configured as a portable system that can be driven on roads and used to scan vehicles and cargo. FIGS. 2A, 2B and 2C illustrate the low-energy backscatter imaging system 100 of FIG. 1 configured as an X-ray backscatter mobile cargo inspection system 200. FIG. 2A is a break-away perspective view, of the X-ray backscatter mobile cargo inspection system 200 deployed on a truck capable of on-road travel and scanning of an enclosure such as a vehicle or cargo container while one or both of the inspection system and enclosure are in motion. FIG. 2B is a schematic top-view representation of the inspection system shown in FIG. 2A. Referring to FIGS. 1, 2A and 2B, the detector panel 104 (comprising a plurality of independent detector assemblies or modules along with associated filters) is mounted on a mobile platform 210, or conveyance, typically capable of road travel, that traverses a large object to be inspected such as a vehicle or a cargo container 212. Conveyance 210 is characterized by an enclosure 214, here, the skin of a van, shown in FIG. 2A in a cut-away view, to enable depiction of other components of the inspection system. The conveyance may have many alternate embodiments, including but not limited to gasoline, diesel, electric, propane, battery, fuel-cell, or hydrogen-powered motor vehicles (including vans, trucks, or similar), tracked vehicles, sleds, trailers, cranes, or other equipment that can be put into motion, preferably self-propelled, but also including vehicles tethered and pulled such as under electric power.

Contained within enclosure 214 of conveyance 210 is the X-ray source 102, such as an X-ray tube, and the chopper 103. Source energies are typically below 250 keV, thus the chopper 103 may be smaller than employed in systems in which higher-energy X-rays are employed. The chopper 103 may be a rotating perforated hub, or a wheel with transmitting spokes, or any number of means, known in the art, for generation of flying spot beams that lie, typically, in a plane approximately orthogonal to the direction of motion 220. The X-ray tube 102 depicted in FIG. 2B, by way of example, is a panoramic-style X-ray tube that is capable of wide-angle beam generation and additionally may be rotatable to allow scanning on either side of conveyance 210. Rotating hoop 103, with apertures 36 and 38, emits a pencil beam 224, thereby enabling inspection of objects, possibly on either side of the conveyance, herein referred to as "bilateral" inspection. However, all sources are encompassed within the scope of the present invention when employed in the manner described in the present description. The X-ray source and detectors may be oriented to permit scanning from the conveyance's "driver's side", "passenger's side", or both sides simultaneously. Various means are known in the art for mechanically or electronically sweeping a beam of penetrating radiation, including, for example, the rotating chopper wheel 103 depicted in FIG. 2B or electronic scanning is described in detail, for example, in U.S. Pat. No. 6,421,420, issued Jul. 16, 2002, which is incorporated herein by reference.

The independent detector assemblies or modules of the backscatter detector panel 104, along with associated filters, are configured for detecting penetrating radiation from the source 102 that has interacted with, and scattered from, contents of the inspected object 212. In some embodiments, the filtering could be optionally applied to a subset of the independent detector assemblies or modules, removable for normal scanning operations or other incarnations. In some embodiments, the filters are removable so that a normal scan (that is, without filtering) is captured and then a subsequent secondary scan is captured, using the filters, that provides material classification information.

The inspection of object 212 may be conducted by an operator disposed within conveyance 210, or, alternatively, by a remotely disposed operator. For inspection, object 212 may be maintained in a stationary condition, with conveyance 210 traversing the object along direction 220 (forwards or backwards), alternatively, inspection may be conducted while both conveyance 210 and inspected object 212 are in motion. In yet another mode, referred to as a "portal mode," the system is stationary and the object of inspection is conveyed past the system. Where the object of inspection is a person, the person may be required to walk past the conveyance slowly, preferably in both directions, so that both sides of the person can be subjected to search. In a "stationary mode", both the system and the object being scanned are stationary, and a vehicle-mounted x-ray scanning method, configured as a part of the system itself, is employed to create in effect both horizontal and vertical scanning to generate a backscatter X-ray image. Such methods may include the use of an x-y translation stage, electronically-steered X-ray sources as described, for example, in U.S. Pat. No. 6,421,420, or other means.

The relative motion of conveyance 210 and object 212 may be carefully controlled or may be monitored by a sensor 218 which employs any of a variety of sensing methods, such as radar, ultrasound, or optical, including laser or LIDAR sensing, all provided as examples only, in order to sense the relative speed of conveyance 210 with respect to object 212. A signal provided by sensor 218 is employed by controller 240 in one or more of the following modalities: the vehicle speed may be regulated, or, alternatively, the pixel registration may be corrected to compensate for vehicle speed anomalies in order to produce aspect-ratio-correct, distortion-free, backscatter X-ray images. Relevant techniques include, but are not limited to: the use of high precision speed-sensing devices to accurately measure vehicle speed at low (0.5 to 10 mile-per-hour) ranges; the use of low-speed (0.5 to 10 mile-per-hour) electronic and/or software-based engine and/or transmission controls; and the use of custom vehicle drive-train gear designs, which simultaneously produce low vehicle scan speed while maintaining the capability of offering roadworthy speed ranges, up to at least 55 miles per hour. In an embodiment, the speed of conveyance 210 does not impact scan quality, as the rate of capture of scan data is fixed by a rotation speed of the chopper wheel 103.

It should be appreciated that the independent assemblies or modules of the backscatter detector panel 104 are carried by conveyance 210 and typically enclosed within enclosing body 214 and concealed from view from outside the conveyance. They may also be carried outside the conveyance for particular applications within the scope of the present invention. For example, as shown in FIG. 2C, the detector panel 104 is positioned outside the conveyance 210 and the X-ray tube 102 fires X-rays through a vertical gap 232 in the detector panel 104.

Figure 3:
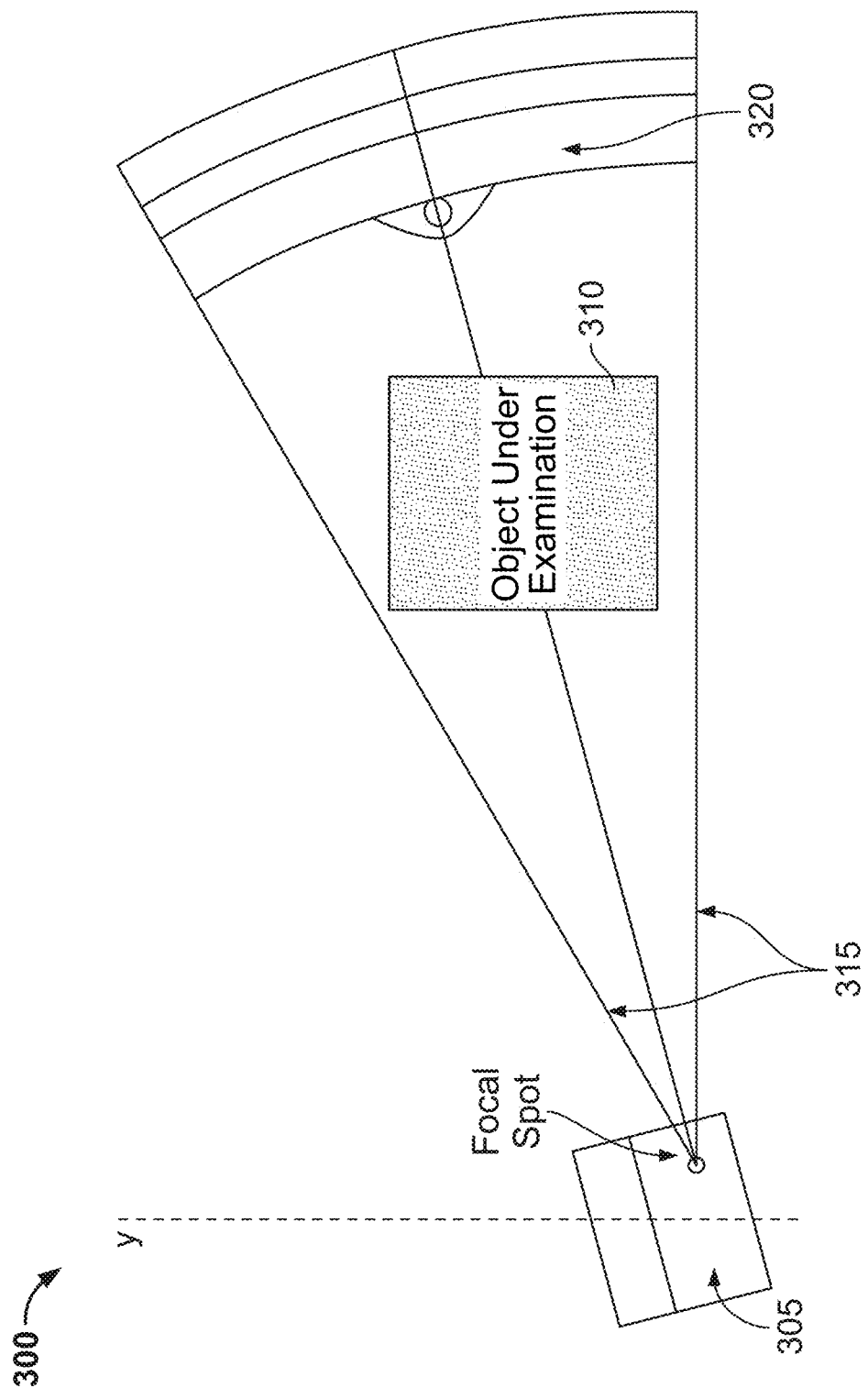
FIG. 3 is a diagram showing an exemplary LINAC-based high-energy X-ray cargo inspection system, in accordance with some embodiments of the present specification.

Additionally, in some embodiments, the low-energy backscatter imaging system 100 of the present specification may be integrated with a high-energy transmission-based cargo inspection system. FIG. 3 illustrates an exemplary LINAC-based high-energy X-ray cargo inspection system 300 that may be integrated with the low-energy backscatter imaging system 100 described in the present specification. As shown, the cargo inspection system 300 comprises a high-energy radiation source 305, for irradiating an object under inspection 310 with a vertically divergent fan beam of radiation 315. The high-energy radiation source 305 may be, but is not limited to, a linear accelerator (LINAC), or a gamma radiation source. The radiation source 305 may include a radioisotopic source, an X-ray tube or any other source known in the art capable of producing a sufficiently high beam flux and energy to direct a beam to traverse the space through an object under inspection to detectors at the other side. In embodiments, the X-ray tube or any other source provides a radiation dose that can penetrate imaging containers and cargo walls which are typically made of steel and are around 300 mm wide. In an embodiment, the energy and dose output of said X-ray tube or any other source ranges from 4.5 MeV to 10 MeV and 0.07 Gy/min to 2 Gy/min respectively.

The choice of source type and its intensity and energy depends upon the sensitivity of the detectors, the radiographic density of the cargo in the space between the source and detectors, radiation safety considerations, and operational requirements, such as the inspection speed. One of ordinary skill in the art would appreciate how to select a radiation source type, depending upon his or her inspection requirements. In one embodiment, where the object under inspection is a large sized container or car that highly attenuates the X-ray beam, the radiation may be from an X-ray tube operating at a voltage in substantial excess of 200 keV, and may operate in a region of approximately 4.5 MeV and even up to 10 MeV or more. In one embodiment, object under inspection 310 is a vehicle, truck, rail car, or other container for carrying cargo or passenger luggage or general belongings.

The cargo inspection system 300 further comprises a detector array 320, which is preferably positioned behind the object under inspection 310 and is used to detect radiation transmitted through the object under inspection 310. The detectors may be formed by a stack of crystals that generate analog signals when X-rays impinge upon them, with the signal strength proportional to the amount of beam attenuation in the object under inspection 310. In one embodiment, the X-ray beam detector arrangement consists of a linear array of solid-state detectors of the crystal-diode type. A typical arrangement uses cadmium tungstate scintillating crystals to absorb the X-rays transmitted through the object under inspection and to convert the absorbed X-rays into photons of visible light. Crystals such as bismuth germinate, sodium iodide or other suitable crystals may be alternatively used as known to a person of ordinary skill in the art. The crystals can be directly coupled to a suitable detector, such as a photodiode or photo-multiplier. The detector photodiodes could be linearly arranged, which through unity-gain devices, provide advantages over photo-multipliers in terms of operating range, linearity and detector-to-detector matching. In another embodiment, an area detector is used as an alternative to linear array detectors. Such an area detector could be a scintillating strip, such as cesium iodide or other materials known in the art, viewed by a suitable camera or optically coupled to a charge-coupled device (CCD).

A Hand-Held Inspection System

Explosive and drug detection techniques can be broadly classified into two main categories: bulk detection and trace detection. Trace detection involves the chemical detection of explosives or drugs by collecting and analyzing tiny amounts of vapor or particles (a microscopic amount of explosive/drugs) and looking for residue or contamination from handling or being in proximity to explosive/contraband materials. Microscopic particles of solid materials can adhere to a wide variety of surfaces (Teflon, glass, metal, plastic, etc.), and they can be detected by wiping the surface. Vapor detectors examine the vapor emanating from a liquid or a solid explosive/drug, and because particularly some explosives have a low vapor pressure, these detection techniques would be very sensitive. Both of the bulk detection and trace detection techniques rely on the ability to gain close proximity to the material under inspection, rely on the material being "open" to detection, and not concealed behind obscuring materials that prevent visual identification of the threat material in the first place. In accordance with some aspects, the present specification is directed towards a solution that combines the material classification capabilities of the backscatter imaging system 100 for hidden materials with the explosive characterization capabilities of existing trace detectors in order to tackle the high volume of concealed explosive or drug materials moving across borders.

Figure 4:
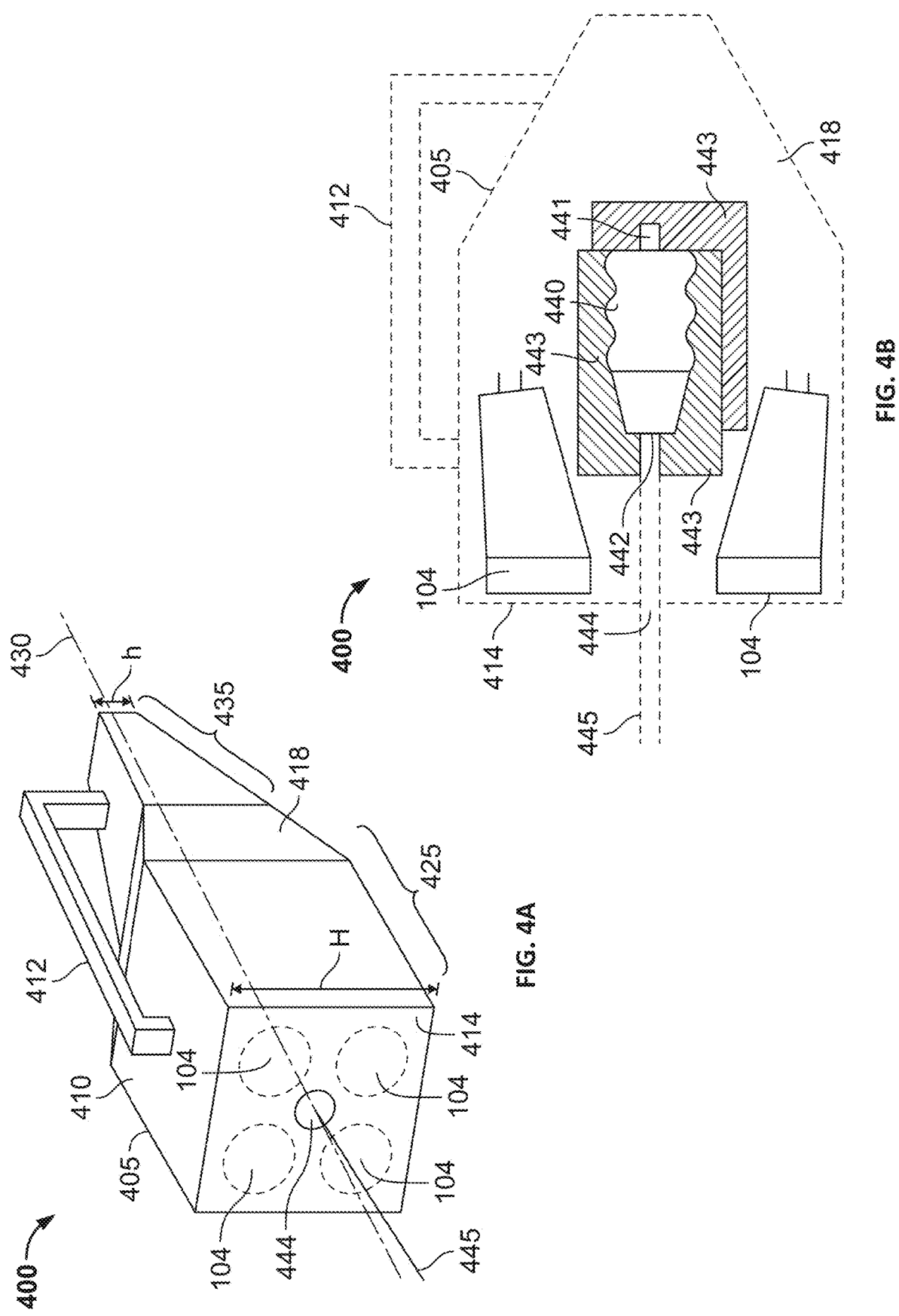
FIG. 4A is a perspective view of a hand-held portable X-ray based scanning system, in accordance with some embodiments of the present specification.
FIG. 4B is a top-down, internal view of the hand-held portable X-ray based scanning system, in accordance with some embodiments of the present specification.

Therefore, in accordance with some embodiments, the low-energy backscatter imaging system 100 of the present specification is configured as a hand-held system. FIGS. 4A and 4B illustrate the low-energy backscatter imaging system 100 of FIG. 1 configured as an X-ray backscatter based hand-held scanning system 400. FIG. 4A illustrates an embodiment of a hand-held portable X-ray based scanning system 400, also referred to as an imaging system or device, for use in screening objects such as, but not limited to, baggage, containers/boxes, and other similar items for threat materials, items or people concealed therein. The system 400 is configured, in one embodiment, in the form of an enclosure or housing 405 having an upper surface 410, a base (not visible in FIG. 4A, but opposite, and substantially parallel to, the upper surface 410), a front surface 414, a rear surface (not visible in FIG. 4A, but opposite, and parallel to, the front surface 414), a first side 418, and a second side (not visible in FIG. 4A, but opposite, and parallel to, the first side 418). In accordance with one embodiment, the size and weight of system 400 is optimized for enabling an operator to conveniently hold and maneuver the housing 405 while scanning an object under inspection. In one embodiment, housing 405 is in the form of a first cuboid 425 (bearing the front surface 414) that tapers, along a central longitudinal axis 430, into a second cuboid 435 culminating in the rear surface. In accordance with an embodiment, a height 'H' of the first cuboid 425 is greater than a height 'h' of the second cuboid 435. It should, however, be appreciated that the shape of the housing 405 can be cylindrical, conical, pyramidal or any other suitable shape in various embodiments. Specifically, in one embodiment, housing 405 is in the form of a first cuboid 425 that attaches, at a back face and along a central longitudinal axis 430, to a first trapezoidal prism 418 that tapers and, at its back face, attaches a second trapezoidal prism 435.

At least one handle 412 is provided on, for example, the upper surface 410 to allow the operator to hold the housing 405 conveniently in one or both hands and manipulate the device 400 to point the front surface 414 towards and at different regions on the object under inspection. In alternate embodiments one or more handles are provided on one or more areas or regions such as the upper surface 410, the base, the first side 418 and/or the second side so that single-handed or two-handed operation of device 400 is facilitated, depending on what is easiest for the operator.

Referring now to FIGS. 4A and 4B, the housing 405 comprises an X-ray tube 440 whose anode 441, also referred to as a target, emits a spatially localized X-ray beam 445 through an opening 442, also referred to as an aperture. At least one shield 443, formed of an X-ray absorptive material, such as tungsten or uranium, surrounds and encloses anode 441 to absorb stray radiation emitted from anode 441. Opening 442, defined through shield 443, is provided with a size and thickness which enables opening 442 to act as a collimator in forming or shaping and limiting the X-ray radiation, emitted from anode 441, into a shaped beam of X-rays 445. In one embodiment, X-ray beam 145 is shaped into a pencil beam.

A cathode and heater filament assembly (enclosed within housing 405) is held at a substantial potential difference (using a chargeable battery also enclosed within the housing 405) with reference to anode 441 by a kilovolt power supply (wrapped around at least one tube shielding 443, in one embodiment). This potential difference causes thermionic electrons freed by the heated cathode (heated using the heater filament) to be directed and drawn to anode 441 at sufficiently high velocity to result in the generation of X-ray beam 445.

In accordance with an embodiment, shaped X-ray beam 445 emerges through an opening 444 at the center of front surface 414 of housing 405, in a direction substantially perpendicular to front surface 414. The detector panel 104 comprising at least one or a plurality of independent detector assemblies or modules along with associated filters is positioned adjacent to and behind front surface 414 such that the independent detector assemblies or modules along with associated filters surround the area or region of emergence of X-ray beam 445 at opening 444 and cover a substantial area of front surface 414 in order to maximize detected backscatter signal. Thus, each of the independent detector assemblies or modules (of the detector panel 104) is filtered with different thicknesses of material to provide a signal proportional to a certain energy within the backscattered data in order to provide a quantitative measure of the X-ray beam coming back from the scattering object.

In some embodiments, the filters are removable so that a normal scan (that is, without filter) is captured and then a subsequent secondary scan is captured, using the filters, that provides material classification information. An embodiment of the present specification comprises four sets of independent detector assemblies or modules along with associated filters. In other embodiments, a different number of independent detector assemblies or modules along with associated filters may be utilized.

As will be evident to one skilled in the art, many detector topologies are possible, such as, but not limited to, square segmented, circular segmented or annular, while the endeavor is to balance cost against complexity and overall detection efficiency. The detector surface adapted to receive scattered X-ray radiation is positioned proximate the front surface 414 of housing 405.

Methods for Energy Spectrum Reconstruction

In accordance with some aspects, the present specification is directed towards a method of mathematically calculating spectral information using backscatter scan data from energy integrating detectors. The following mathematical system of equations are designed to back calculate the energy spectrum, from a set of response measurements from energy integrating detectors, by modelling the energy spectrum reconstruction problem as an inverse problem:

Consider a linear system represented by equation:

$$A\vec{x} = \vec{b} \qquad (1)$$

The linear system describes how a set of measurements can be related to a physical model and a set of parameters. The physical model is given by the matrix A, the parameters by the vector $\vec{x}$ and the measurements by the vector $\vec{b}$. It is often required to find the parameters of a model given a set of measurements, that is find $\vec{x}$ given an assumed model A and measurements $\vec{b}$. This is known as an inverse problem.

In the case where the linear system is consistent, the solution is $\vec{x} = A^{-1}\vec{b}$. However, in practice measurement errors and model simplifications mean that the system is more likely an inconsistent system that can be described by the following equation:

$$A\vec{x} \approx \vec{b} \qquad (2)$$

Complex systems in many scientific fields are modelled using this type of linear system. Solving the inverse problem is therefore fundamental to many scientific methods, including geological surveying, image de-blurring and X-ray tomographic imaging. Thus, the techniques for solving the equation 1 (that is, $A\vec{x} = \vec{b}$) are part of a broad range of "linear regression" approaches. The most standard approach adopted is that of least squares fitting, however this becomes complicated when there is no $\vec{x}$, or more than one $\vec{x}$, that satisfies the equation 1—that is, the solution is not unique. Solutions of this type are referred to as ill-posed. To work around this, "regularization" terms can be included into determination of the minimum value of the squared residuals (least squares) to give "preference" to a particular solution which has desirable properties based on an understanding of the real-world properties of the problem. It is the format of the regularization term that dictates the approach of the present specification in formulating and solving the energy reconstruction problem as an inverse problem.

There are many different algorithms that can be used to solve inverse problems. Popular methods include iterative algorithms such as, but not limited to, Landweber, ART (algebraic reconstruction technique) and CGLS (conjugate gradient least squares), matrix decomposition methods such as, but not limited to, SVD (singular value decomposition) and TSVD (truncated-SVD), and back-projection methods such as, but not limited to, FDK (Feldkamp-Davis-Kress) (with a particular application to X-ray CT imaging).

The ART and CGLS algorithms are iterative methods where the regularization is controlled by the number of iterations. The solution starts off smooth and as the iteration number increases, smoothing decreases. In X-ray CT applications, iterative methods enable reconstruction of images with a larger signal to noise ratio. Less radiation dose is required to produce a similar quality image when compared to other methods such as filtered back projection, therefore the ART and CGLS algorithms are most suited to this application, particularly for materials with low photon statistics (those with $Z_{eff} > 10$). The optimum number of iterations to run for is decided by the user. The ART method (also known as Kacsmarz's method) is a simple and widely used iterative algorithm. However, ART is associated with a slow convergence speed, hence more iterations need to be run before the optimum solution is achieved, taking up more computational time. On the other hand, CGLS is a faster algorithm that converges in fewer iterations.

The SVD algorithm is a method that involves solving the equation $\vec{b} = A\vec{x}$ by finding the matrix singular value decomposition (SVD) of A and using this to calculate the inverse of A. This is analogous to finding the different frequency components of the solution. The truncated version of the SVD (TSVD) is where higher frequency components in the SVD of A are not included in the solution. The higher frequency components are those corresponding to noise in the scan data, so including these result in a nonsensical solution similar to having too small a regularization parameter in the Tikhonov algorithm. The regularization in the TSVD algorithm is based on a user's choice of how many frequency components to include. The disadvantage of the TSVD method is that the SVD must be calculated initially and, for very large A, this can be a computationally intensive task.

It should therefore be appreciated that the choice of a reconstruction method depends on a plurality of factors including the complexity of the problem, speed required for solution convergence, and formulation of the problem.

In most applications of inverse problems, there are many least squares solutions to the problem formulated as equation 2 above, especially if the dimensions of the matrix A are large. In accordance with some embodiments, Tikhonov regularization (also known as ridge regression) is a method that is used to choose the most suitable least squares solution.

The present specification now describes how the energy spectrum reconstruction problem can be formulated and solved as an inverse problem. The detector response from an energy integrating detector D, can be written as:

$D = \int_0^{E_{max}} EN(E)\, dE \ldots (3)$, where E is the photon energy, N(E) is the number of photons with energy E, and $E_{max}$ is the maximum energy in the energy spectrum. Equation 3 describes a perfect case that does not account for detector efficiency effects. Equation 3 can be discretized so that:

$D \approx \sum_{i=0}^{m} E_i N_i \ldots (4)$, where $N_i$ is the number of counts in bin i and $E_i$ is the bin energy (usually the bin center) over the energy range 0 to $E_{max}$. The total number of bins in the spectrum is m.

Consider a hypothetical energy spectrum where m=2. The spectrum consists of two bins with the midpoint energy of each bin as $E_0$ and $E_1$. The number of counts in each bin is $N_0$ and $N_1$. In order to reconstruct (or "unfold") the energy spectrum, two different detector response measurements are required, each with a different thickness of filter. If the spectrum is passed through two different filters, one with thickness $x_0$ and the other with thickness $x_1$, the following relations are obtained through equation 4 and the Lambert-Beer law [that is, considering an object of thickness L, an X-ray beam with intensity $I_o$ is incident on the object. If the X-ray beam is monochromatic with energy E the intensity of the X-ray beam after traversing a full length of the object is $I_T(L,E) = I_o(E)\, e^{-\sigma(E)\rho L}$]:

$$D_{x_0} = E_0 N_0 e^{-\mu(E_0)x_0} + E_1 N_1 e^{-\mu(E_1)x_0}$$

$$D_{x_1} = E_0 N_0 e^{-\mu(E_0)x_1} + E_1 N_1 e^{-\mu(E_1)x_1} \qquad (5)$$

Equation 5 is a set of two simultaneous equations which can be solved for $N_0$ and $N_1$ provided $D_{x_0}$ and $D_{x_1}$ are known. $D_{x0}$ and $D_{x1}$ are the filtered response measurements so can be measured experimentally.

Equation 5 can be written in matrix form as:

$$\begin{pmatrix} D_{x_0} \\ D_{x_1} \end{pmatrix} = \begin{pmatrix} E_0 e^{-\mu(E_0)x_0} & E_1 e^{-\mu(E_1)x_0} \\ E_0 e^{-\mu(E_0)x_1} & E_1 e^{-\mu(E_1)x_1} \end{pmatrix} \begin{pmatrix} N_0 \\ N_1 \end{pmatrix}. \quad (6)$$

This demonstrates that in order to calculate an energy spectrum with two bins, a detector response measurement D needs to be acquired for two different filters and the above system of linear equations (that is, equation 6) solved for $N_0$ and $N_1$. $N_0$ and $N_1$ give the number of photons with energy $E_0$ and $E_1$ respectively, hence an estimation of the energy spectrum. This can be generalized for a spectrum with 'm' bins calculated using 'n' different filtered detector response measurements in the form of the following linear equations:

$$\begin{pmatrix} D_{x_0} \\ D_{x_1} \\ \dots \\ D_{x_n} \end{pmatrix} = \begin{pmatrix} E_0 e^{-\mu(E_0)x_0} & E_1 e^{-\mu(E_1)x_0} & \dots & E_m e^{-\mu(E_m)x_0} \\ E_0 e^{-\mu(E_0)x_1} & E_1 e^{-\mu(E_1)x_1} & \dots & E_m e^{-\mu(E_m)x_1} \\ \dots & \dots & \dots & \dots \\ E_0 e^{-\mu(E_0)x_n} & E_1 e^{-\mu(E_1)x_n} & \dots & E_m e^{-\mu(E_m)x_n} \end{pmatrix} \begin{pmatrix} N_0 \\ N_1 \\ \dots \\ N_m \end{pmatrix} \quad (7)$$

The system of linear equations 7 is then solved to reconstruct an energy spectrum with 'm' bins. For clarity the system of equations 7 can be written as: $\vec{D} = W \vec{N}$ or when taking into account measurement uncertainties in $\vec{D}$, $\vec{D} \approx W \vec{N}$ (8), where:

$$W_{ij} = \Sigma_i^n \Sigma_j^m E_j e^{-\mu(E_j)x_i}.$$

W is known as the system matrix. As the energy spectrum is continuous, W can be thought of as a sample of the filtered detector response at particular energies and material thicknesses.

This method for generating W is known as the quadrature method. The equation 8 above is the same form as the general inverse problem presented earlier as equation 1. The number of counts in each energy bin (the spectrum) can be found by solving the inverse problem.

Therefore, the system matrix or reconstruction model matrix W is based on the attenuation of backscattered scan data through each thickness of 'n' filters placed over 'm' spatially distributed, independent detector assemblies or modules. The attenuation is described by a complex function of X-ray energy and filter thickness while also depending on the properties of the filter material. In order to create the system matrix or reconstruction model matrix W, this function is sampled at 'm' different energies and 'n' filter thicknesses using a quadrature method.

In various embodiments, the aforementioned system of equations (more specifically, equations 3 to 8) can be defined and solved (for spectral energy reconstruction) for a system: having at least two independent detector assemblies or modules each with a filter of different thickness, and using the different detector responses from the two different detector/filter combinations in the system of equations. This yields energy spectrum information for 'm' bins calculated from 'n' different filtered detector response combinations. In some embodiments, m=n=at least 2.

Filters

The choice of filters $\{x_0, x_1, \ldots x_n\}$ is integral to the reconstruction problem. As discussed earlier in this specification, the choice of filters depends on the spectrum reconstruction problem, particularly on the X-ray spectrum energy range and the number of energy bins required.

In accordance with some embodiments, the thicknesses of the material (such as, but not limited to, aluminum) of the filters is chosen so that for each energy bin there is a predefined percentage of signal transmitted at the bin-center energy. In some embodiments, the predefined signal transmission percentage is chosen to ensure a measurable difference between filters and a reasonable detection rate for each filter. In some embodiments, the same transmission percentage is used for each filter to ensure linear bin spacing.

The filter thickness $x_f$ is calculated by considering the attenuation equation given by the Lambert-Beer law:

$$x_f = \frac{1}{\mu(Ec)} \ln(10), \quad (9)$$

where p is the attenuation coefficient for the filter material at the bin-center energy, $E_C$. The number '10' reflects an example use case of 10 bins, in accordance with an embodiment, but can be any number depending upon the amount of binning required, in alternate embodiments.

In an example use case, 10 bins were taken for a 50 keV X-ray beam and the filter material was chosen as aluminum. The thicknesses of the aluminum filters were chosen so that for each energy bin, the percentage of radiation, i.e. gamma rays, transmitted at the bin-center energy was 10%. This transmission percentage was chosen to ensure a measurable difference between filters and a reasonable detection rate for each filter. The same transmission percentage was used for each filter to ensure linear bin spacing. While, in one embodiment, a constant transmission percentage of 10% was used—other combinations of transmission percentages and non-linear bin spacing may be used in alternate embodiments. Accordingly, the thinnest filter (filter A) is 0.0066 mm thick (10% of 2.5 keV X-rays transmitted through 0.0066 mm of Aluminum), and the thickest filter (filter J) is 21.1 mm thick (10% of 47.5 keV X-rays transmitted through 21.1 mm of aluminum). All other filter thicknesses are shown in table K below:

TABLE K

| # | EC, keV | Filter thickness, mm |
|---|---|---|
| A | 2.5 | 0.0066 ± 0.0015 |
| B | 7.5 | 0.14 ± 0.01 |
| C | 12.5 | 0.63 ± 0.02 |
| D | 17.5 | 1.68 ± 0.09 |
| E | 22.5 | 3.47 ± 0.16 |
| F | 27.5 | 6.0 ± 0.22 |
| G | 32.5 | 9.26 ± 0.28 |
| H | 37.5 | 13.0 ± 0.34 |
| I | 42.5 | 17.0 ± 0.38 |
| J | 47.5 | 21.1 ± 0.43 |

Figure 5:
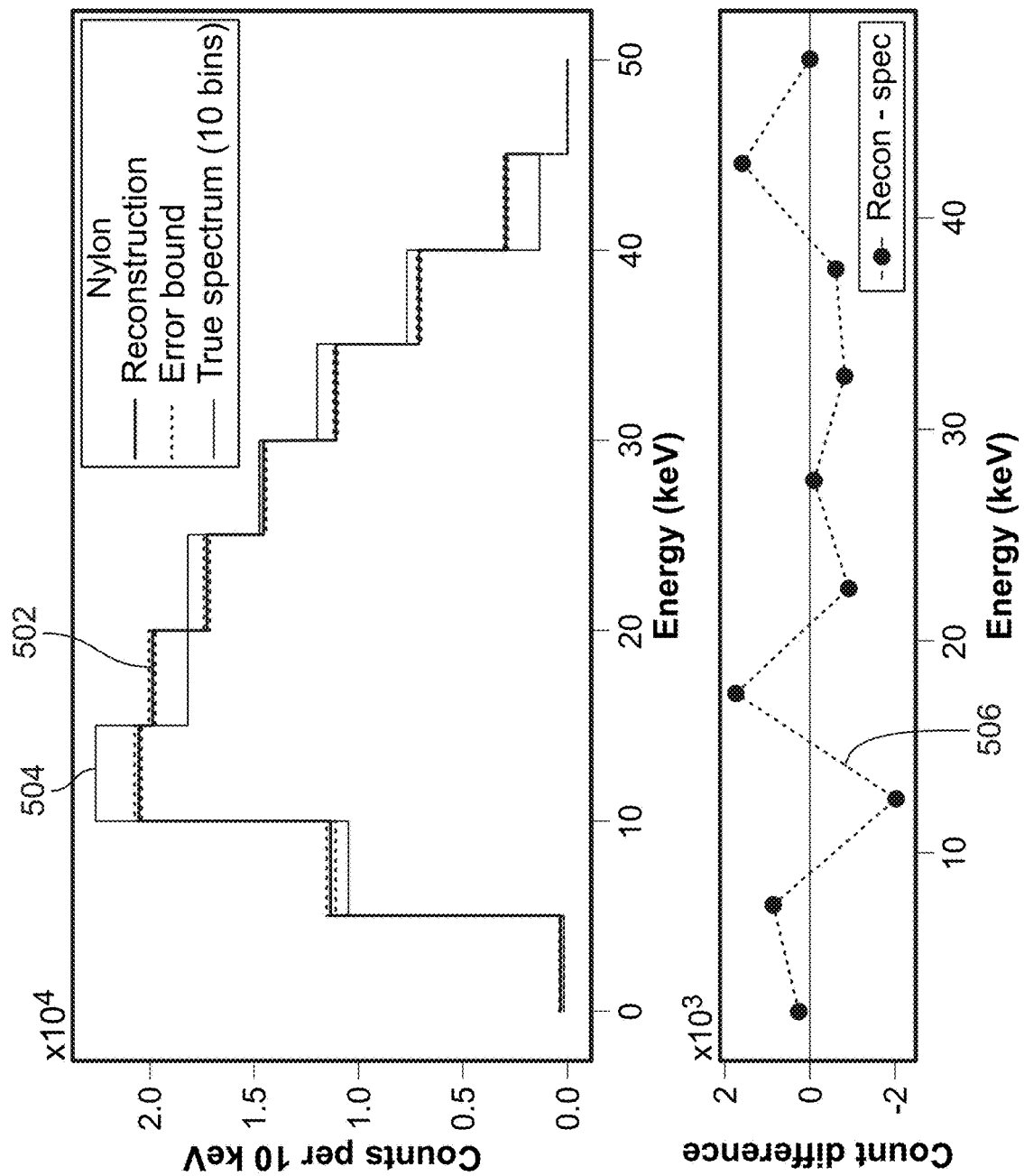
FIG. 5 is a of showing a reconstructed spectrum for 10 mm of Nylon as a scattering material, in accordance with some embodiments of the present specification.

Continuing with the example use case, energy integrated measurements of the ten filters of Table K were simulated for a 10 mm Nylon scatter object. The detector response data was then reconstructed. FIG. 5 shows a first graphical representation 502 indicative of the reconstruction of the detector response data (that is, reconstructed spectrum) and a second graphical representation 504 indicative of the true spectrum. A third graphical representation 506 is indicative of a difference between the reconstruction and true spectrum.

Figure 6:
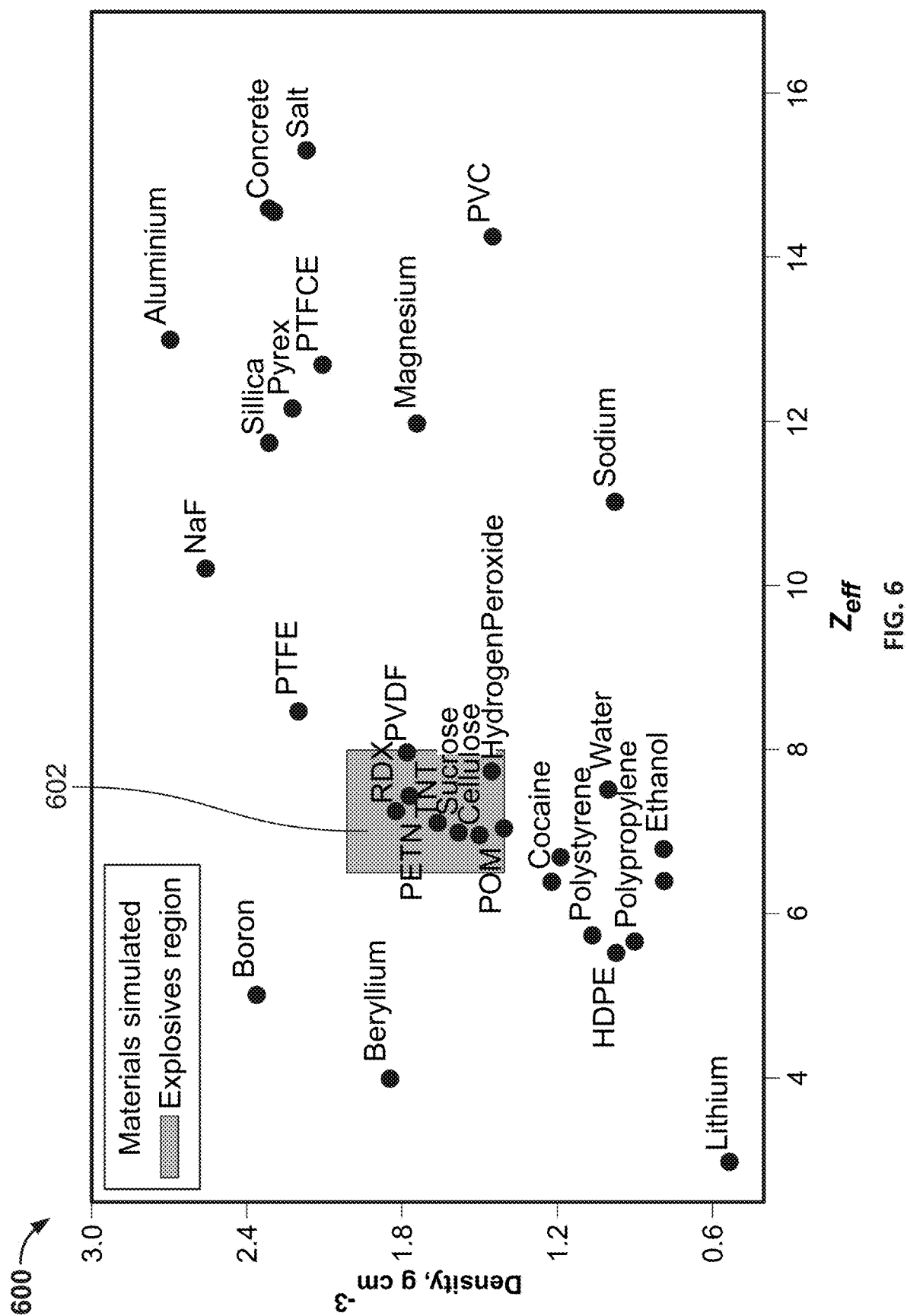
FIG. 6 is a plot showing a plurality of organic materials on the basis of their atomic number and density properties.

FIG. 6 shows a plot 600 of a plurality of organic materials on the basis of their atomic number ($Z_{eff}$) and density properties. As shown, there is a marked grouping 602 of "explosive materials" on the plot 600. Therefore, as discussed further below, in some embodiments, in the absence of a direct measure of Z effective or density, the systems and methods of the present specification enable identifying features in the reconstructed backscatter energy spectrum that reflect these properties so that a similar grouping of explosive materials may be reproduced and separated from other inert materials.

Figure 7:
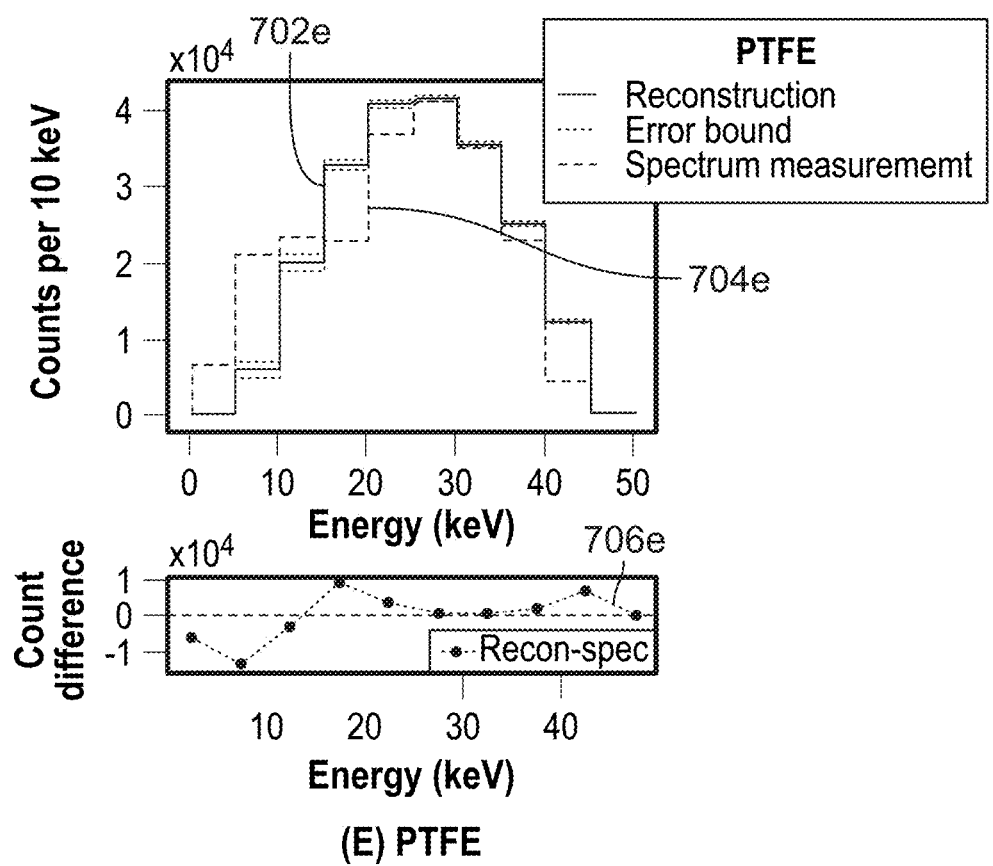
FIG. 7 shows first, second, third, fourth and fifth plots indicative of energy spectrum reconstruction for HDPE, POM, PVDF, PTFE and PVC, respectively, in accordance with some embodiments of the present specification.

Continuing with the example use case, the energy spectrum reconstruction method of the present specification was applied to reconstruct spectrum from experimental backscatter measurement or data of HDPE (High-Density Polyethylene), POM (Polyoxymethylene), PVDF (Polyvinylidene-Fluoride), PTFE (Polytetrafluoroethylene) and PVC (Polyvinylchloride). FIG. 7 shows first, second, third, fourth and fifth plots 702a, 702b, 702c, 702d, 702e indicative of energy spectrum reconstruction for HDPE, POM, PVC, PVDF and PTFE, respectively; sixth, seventh, eighth, ninth and tenth plots 704a, 704b, 704c, 704d, 704e are indicative of energy spectrum measurements obtained using equivalent CdTe measurements of the energy spectrum binned to 10 bins (the spectrum measurement was normalized to the total number of counts in the reconstruction); and eleventh, twelfth, thirteenth, fourteenth and fifteenth plots 706a, 706b, 706c, 706d and 706e are indicative of error in the reconstruction.

Figure 8A:
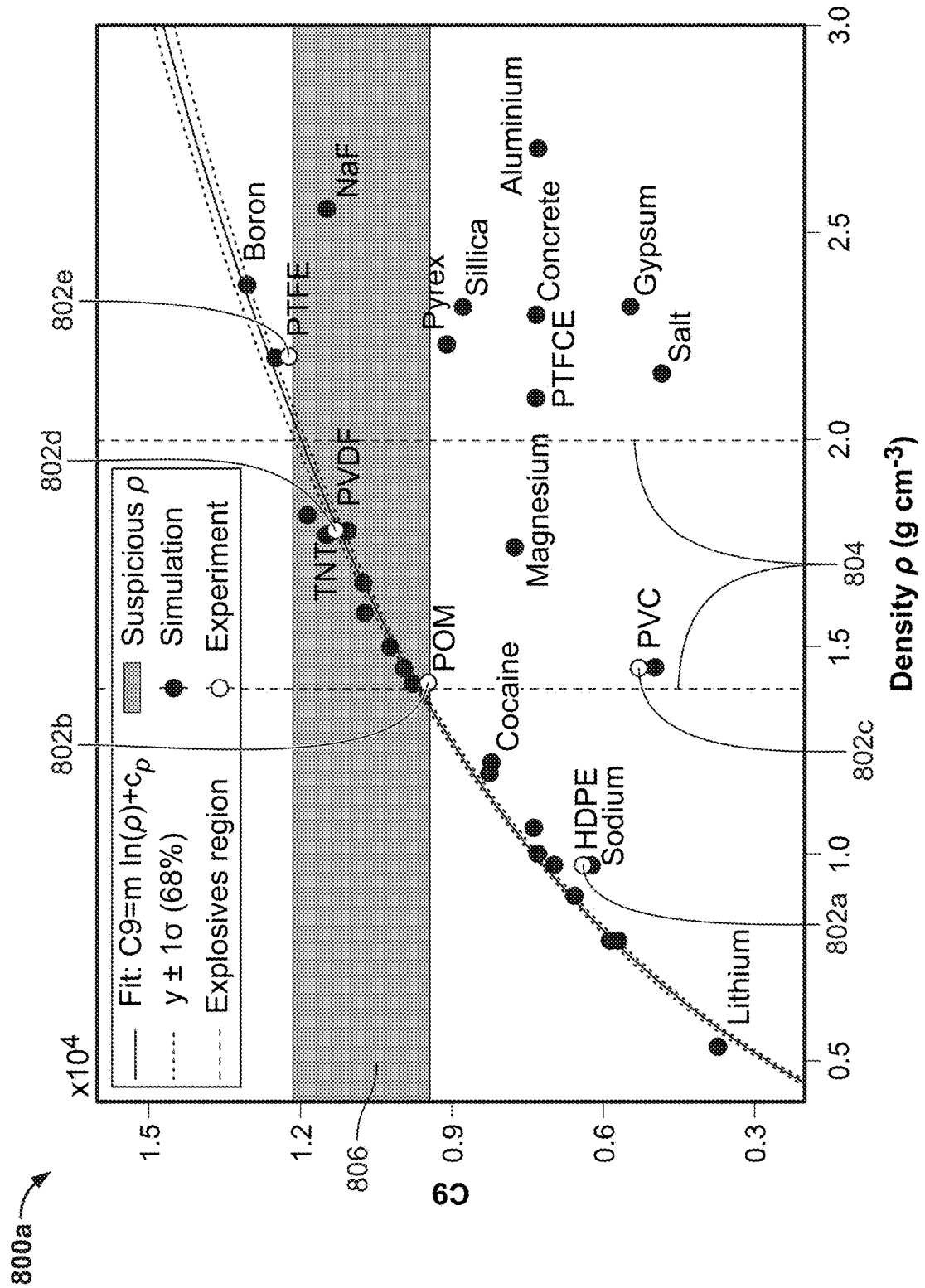
FIG. 8A is a first plot of a number of counts between 40 and 45 keV (the 9th reconstructed energy bin) as a function of density, in accordance with some embodiments of the present specification.

FIG. 8A shows a first plot 800a of a number of counts between 40 and 45 keV (that is, the $9^{th}$ reconstructed energy bin) as a function of density for reconstructions using the plurality of organic materials (FIG. 6). The experimental backscatter measurement or data of HDPE, POM, PVC, PVDF and PTFE is shown as dots 802a, 802b, 802c, 802d and 802e, respectively. The explosive material density region $1.4 \leq \rho \leq 2.0$ g/cm$^3$ is shown by the vertical dashed lines 804. Region 806 of C9 (the $9^{th}$ reconstructed energy bin) values corresponds to densities in the explosives region.

Figure 8B:
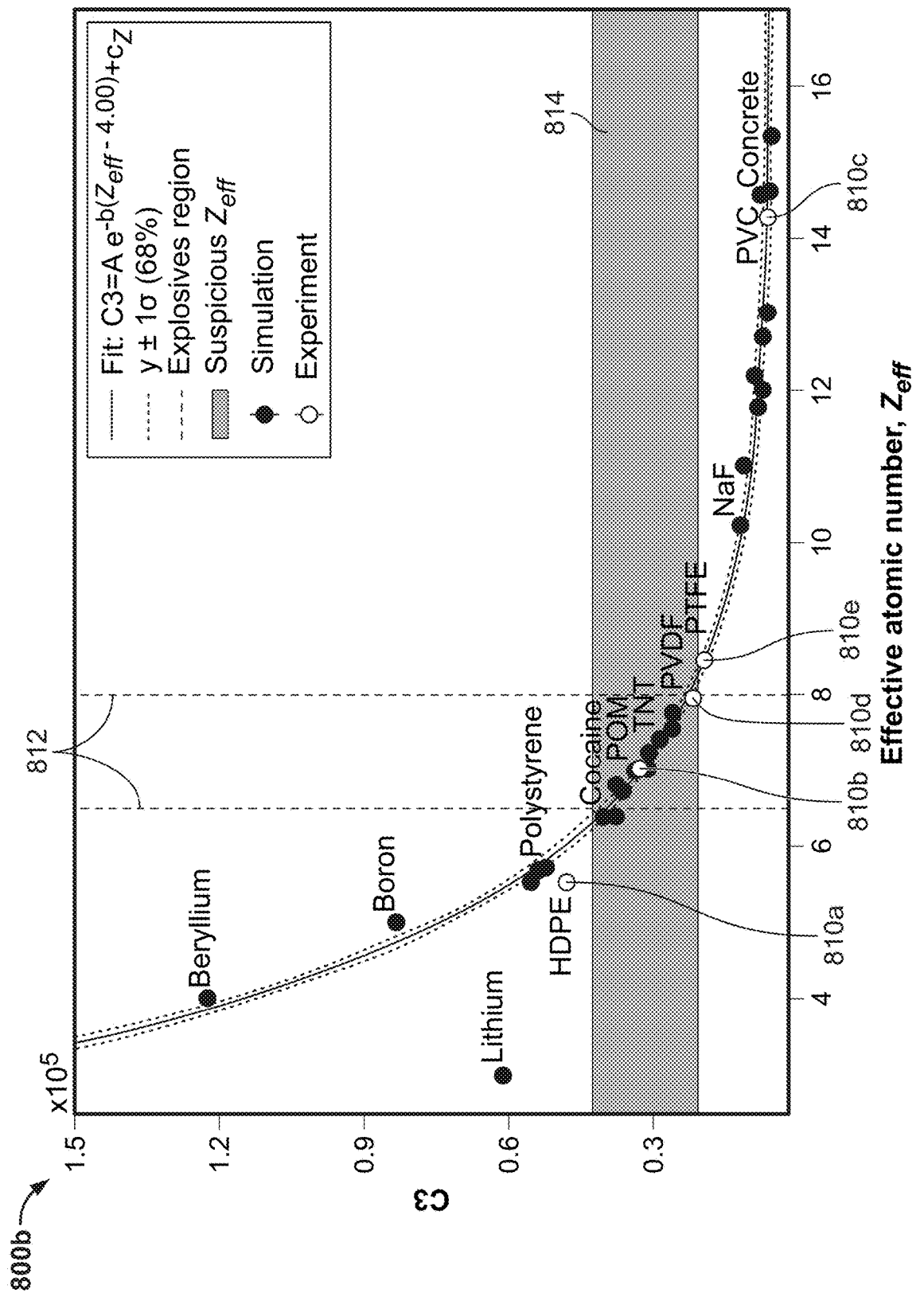
FIG. 8B is a second plot of a number of counts between 10 and 15 keV (the 3rd reconstructed energy bin) as a function of effective atomic number, in accordance with some embodiments of the present specification.

FIG. 8B shows a second plot 800b of a number of counts between 10 and 15 keV (that is, the $3^{rd}$ reconstructed energy bin) as a function of effective atomic number ($Z_{eff}$) for reconstructions using the plurality of organic materials (FIG. 6). The experimental backscatter measurement or data of HDPE, POM, PVC, PVDF and PTFE is shown as dots 810a, 810b, 810c, 810d and 810e, respectively. The explosives region $6.5 \leq Z_{eff} \leq 8.0$ is shown by the vertical dashed lines 812. Region 814 of C3 (the $3^{rd}$ reconstructed energy bin) corresponds to $Z_{eff}$ in the explosives region.

Figure 8C:
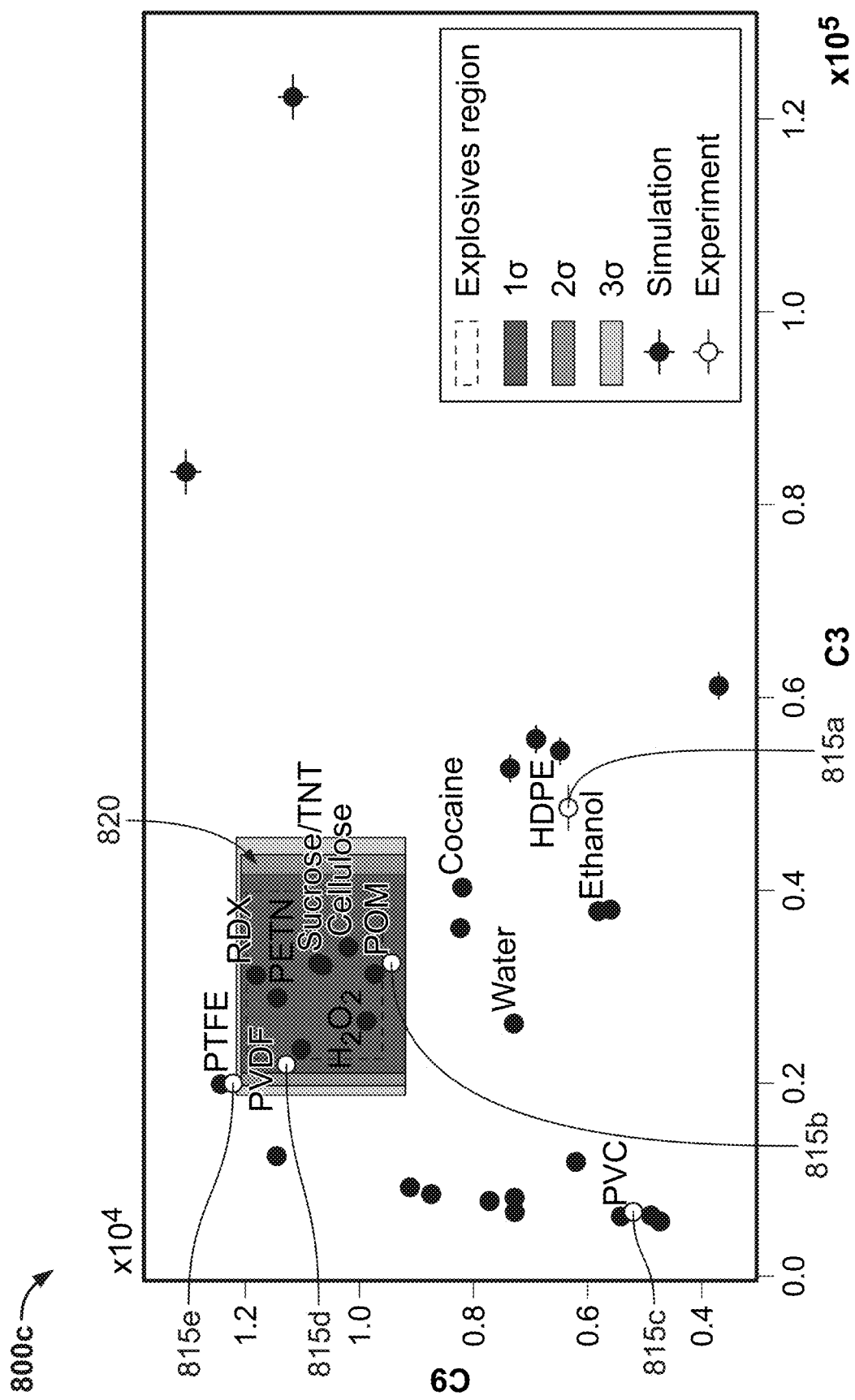
FIG. 8C is a third plot of a number of counts between 10 and 15 keV in a reconstructed energy spectrum as a function of number of counts between 40 and 45 keV in a reconstructed energy spectrum, in accordance with some embodiments of the present specification; and, FIG. 9 is a flowchart of a plurality of exemplary steps of a method of using backscattered scan data in order to classify or characterize materials, in accordance with some embodiments of the present specification.

FIG. 8C shows a third plot 800c of a number of counts between 10 and 15 keV in reconstructed energy spectrum (C3=$3^{rd}$ reconstructed energy bin) as a function of number of counts between 40 and 45 keV in reconstructed energy spectrum (C9=$9_1$ reconstructed energy bin) using the plurality of organic materials (FIG. 6). The experimental backscatter measurement or data of HDPE, POM, PVC, PVDF and PTFE is shown as dots 815a, 815b, 815c, 815d and 815e, respectively. Region 820 shows C3 and C9 values corresponding to possible explosive materials.

It should be appreciated that the plots 800a, 800b are indicative of specific intensity measurements in the 3rd and 9th reconstructed energy bins. These correspond to data points on either side of the peak in the signal. One is plotted against density and the other one against $Z_{eff}$ and it is clear that the explosive material types reside within bounded regions, implying that characteristic properties of materials of an explosive nature can be identified from spectral analysis. Finally, the plot 800c is indicative of the intensity signal in both bins C3 and C9 plotted against each other. The plot 800c reveals the region 820 that corresponds to the bulk explosive materials.

The systems and methods of the present specification enable identifying a number of other aspects/features of the data that could reveal more information including gradients of slopes on either side of the peak. An example corresponds to comparing HDPE and PVDF, where the slope of the reconstructed spectrum after the peak is much sharper in the explosive PVDF. Some of this is driven by peak position, which can be seen to vary considerably from one material to the next, as follows:

| Material | Peak Channel |
|---|---|
| HDPE | 4 |
| PVDF | 6 |
| POM | 5 |
| PTFE | 6 |
| PVC | 6 |

Figure 9:
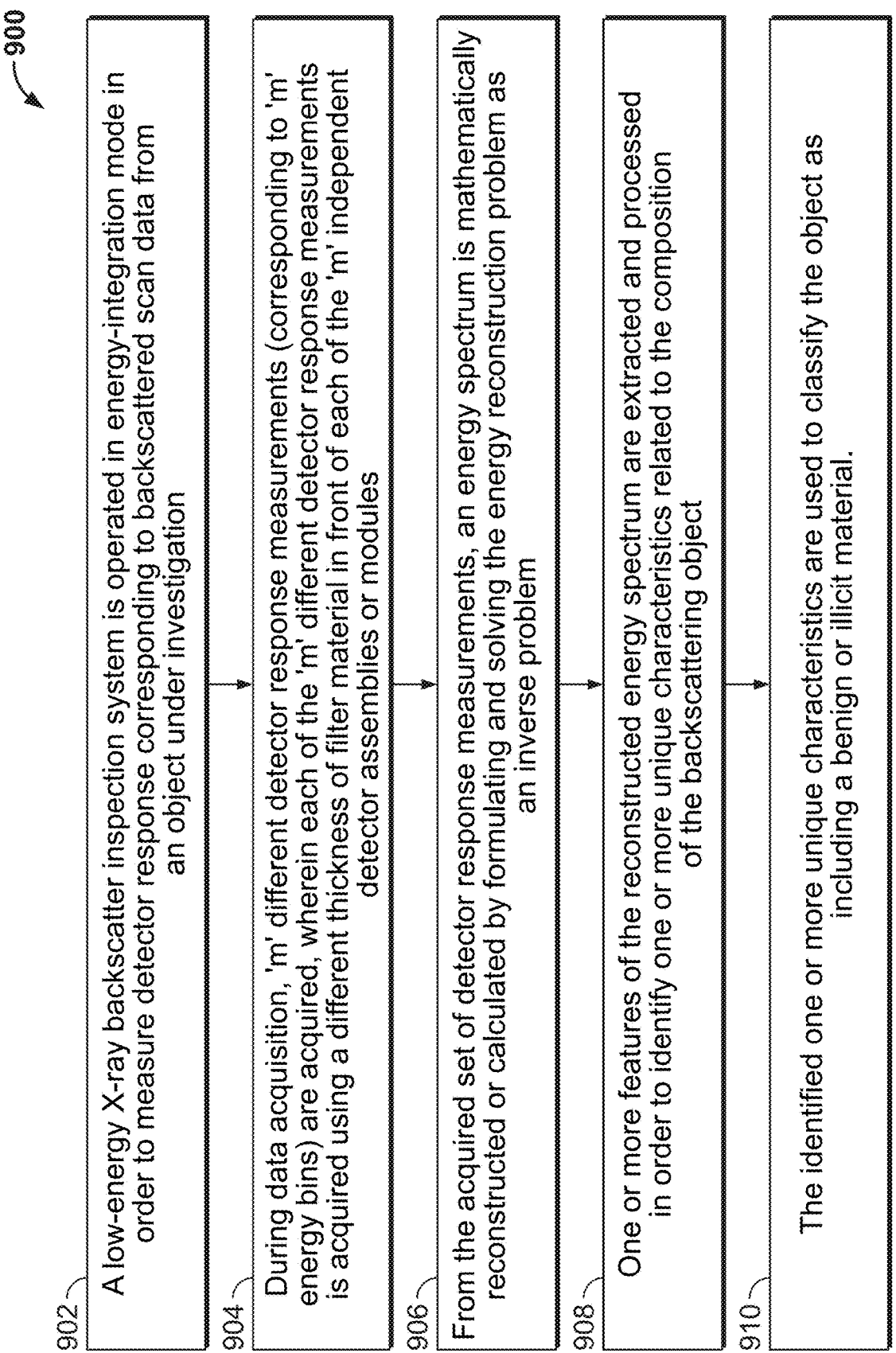

FIG. 9 is a flowchart of a plurality of exemplary steps of a method 900 of using backscattered scan data in order to classify or characterize materials, in accordance with some embodiments of the present specification. In various embodiments, the method 900 may classify or characterize materials such as, but not limited to, explosives, contraband drugs as well as other organic and inorganic materials. In embodiments, the method 900 is executed by a computing device that receives backscattered scan data acquired using the system 100 of FIG. 1. In embodiments, the system 100 is operated to perform one or more scans of one or more known materials in order to calibrate the backscatter scan data. In embodiments, a distance between the system 100 and a material/object under investigation is measured simultaneously while scanning, such that a dose correction factor can be applied for determining an absolute measurement of the material configuration.

At step 902, a low-energy X-ray backscatter inspection system is operated in energy-integration mode in order to measure detector response corresponding to backscattered scan data from an object under investigation. In embodiments, the backscatter inspection system uses a detector panel including an array of 'm' independent detector assemblies or modules, wherein each of the 'm' independent detector assemblies or modules is connected to an optical readout for acquisition of the corresponding detector response. In some embodiments, 'm' ranges from 10 to 24.

At step 904, during data acquisition, 'm' different detector response measurements (corresponding to 'm' energy bins) are acquired, wherein each of the 'm' different detector response measurements is acquired using a different thickness of filter material in front of each of the 'm' independent detector assemblies or modules. Thus, in some embodiments, the number of filters is same as the number of detector assemblies or modules 'm'. However, in some embodiments, the number of filters is different from the number of detector assemblies or modules 'm'. The number of filters and their thicknesses are selected based on the materials being inspected, such that the subsequently reconstructed images that are generated from the detected and filtered signals are able to be used to distinguish features of one material from another, so as to arrive at a higher level of material classification.

At step 906, from the acquired set of detector response measurements, an energy spectrum is mathematically reconstructed or calculated by formulating and solving the energy reconstruction problem as an inverse problem. In embodiments, an impact of the relative location of the spatially distributed, independent detector assemblies is corrected for in the spectrum reconstruction process.

In some embodiments, additional information conveyed in the spatial distribution of backscattered X-rays, as measured by the spatially distributed, independent detector assemblies is included in the energy spectrum reconstruction calculation. The additional information is indicative of positional information that relates to the angular dependency on X-ray scattered energy and dose.

At step 908, one or more features of the reconstructed energy spectrum are extracted and processed in order to identify one or more unique characteristics related to the composition of the backscattering object. In some embodiments, the one or more features correspond to identifying and measuring: a peak intensity value and location in the reconstructed energy spectrum, a first intensity signal on a first side of (that is, prior to) the peak intensity value in the reconstructed energy spectrum, a second intensity signal on a second side of (that is, after) the peak intensity value, a first gradient of the reconstructed energy spectrum on the first side of the peak intensity value and a second gradient of the reconstructed energy spectrum on the second side of the peak intensity value. In some embodiments, the one or more unique characteristics correspond to at least one of: a relationship between the first intensity signal and $Z_{eff}$, a relationship between the second intensity signal and density, a ratio between the first and second intensity signals and a comparative difference between the first and second gradients.

At step 910, the identified one or more unique characteristics are used to classify the object as including a benign or illicit material.

In some embodiments, the material classification data (corresponding to the object under investigation) may be compared against cargo manifest as part of a manifest verification process.

In some embodiments, the method 900 is leveraged to validate cargo homogeneity. That is, the method 900 enables evaluating the consistency of a measurement throughout a cargo container that is reporting a single load type to validate that no other substances have been swapped in place of that declared on the manifest.

The above examples are merely illustrative of the many applications of the system and method of the present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. An X-ray inspection system configured to scan an object, comprising:
   an X-ray source configured to emit a beam of X-rays toward the object, wherein the object comprises one or more materials;
   a detector panel positioned to generate scan data corresponding to X-rays scattered back from the object, wherein the detector panel comprises:
   an array of 'm' spatially distributed and independent detector assemblies, wherein each of the 'm' spatially distributed and independent detector assemblies is configured to detect a range of energies; and
   an array of 'n' filters, wherein each of the 'n' filters has a thickness and is positioned over one of the 'm' spatially distributed and independent detector assemblies, wherein 'n' is based on a required number of energy bins in the range of detected energies, and wherein each of the n filters has a different thickness and each different thickness has a minimum value, wherein the minimum value is a smallest thickness required to distinguish spectral features between similar, but not identical, organic material types; and
   a computing device including a processor and a memory coupled to the processor, wherein the memory stores a plurality of programmatic code which, when executed by the processor, causes the processor to:
   acquire the scan data;
   reconstruct an energy spectrum from the acquired scan data, wherein the reconstructed energy spectrum includes the required number of energy bins;
   extract one or more features of the reconstructed energy spectrum using the energy bins;
   identify one or more unique characteristics related to the one or more materials based on the one or more features; and
   classify the material as being illicit or benign based on the one or more characteristics.

2. The system of claim 1, wherein the detector panel is configured to operate in an energy-integration mode.

3. The system of claim 1, wherein m=n.

4. The system of claim 1, wherein the required number of energy bins is based on a required level of separation between different energy levels from the predefined range of energies for classification of material of the object.

5. The system of claim 1, wherein prior to generating the scan data, each of the 'n' filters is adapted to be removed from being positioned in front of the corresponding 'm' spatially distributed and independent detector assembly in order for the detector panel to generate scan data that is unattenuated.

6. The system of claim 1, wherein the plurality of programmatic code, when executed by the processor, further causes the processor to reconstruct the energy spectrum by configuring an energy spectrum reconstruction problem as an inverse problem.

7. The system of claim 1, wherein the one or more features comprise at least one of: a peak intensity value and location in the reconstructed energy spectrum, a first intensity signal on a first side of the peak intensity value in the reconstructed energy spectrum, a second intensity signal on a second side of the peak intensity value, a first gradient of the reconstructed energy spectrum on the first side of the peak intensity value, or a second gradient of the reconstructed energy spectrum on the second side of the peak intensity value.

8. The system of claim 7, wherein the one or more unique characteristics comprise at least one of: a relationship between the first intensity signal and effective atomic number, a relationship between the second intensity signal and density, a ratio between the first intensity signal and the second intensity signal, or a comparative difference between the first gradient and the second gradient.

9. The system of claim 1, wherein the plurality of programmatic code, when executed by the processor, further causes the processor to correct relative locations of the spatially distributed, independent detector assemblies while reconstructing the energy spectrum.

10. The system of claim 1, wherein the array of 'm' detector assemblies comprises different types of detector materials to enhance detection of the backscattered X-rays based on an overlap of the scan data and presence of absorption edges within the detector materials.

11. A method of classifying a material as being illicit or benign, the method comprising:
operating an X-ray backscatter inspection system in energy-integration mode, wherein the X-ray backscatter inspection system comprises:
an X-ray source configured to direct a beam of X-rays onto a material; and
a detector panel positioned to generate scan data corresponding to X-rays scattered back from the material, wherein the detector panel has an array of 'm' spatially distributed and independent detector assemblies, wherein an array of 'n' filters of unique thicknesses is positioned over the 'm' detector assemblies, and wherein 'n' is based on a required number of energy bins from a range of energies in the scan data;
acquiring the scan data;
reconstructing an energy spectrum from the acquired attenuated scan data, wherein the reconstructed energy spectrum includes the required number of energy bins;
extracting one or more features of the reconstructed energy spectrum using the energy bins;
based on the one or more features, identifying one or more unique characteristics related to the material; and
based on the one or more characteristics, classifying the material as being illicit or benign.

12. The method of claim 11, wherein m=n.

13. The method of claim 11, wherein the required number of energy bins is based on a required level of separation between different energy levels from the range of energies, for classification of material of the object.

14. The method of claim 11, wherein prior to generating the scan data, the array of 'n' filters are removed in order for the detector panel to generate unattenuated scan data.

15. The method of claim 11, wherein the energy spectrum is reconstructed by formulating and solving the energy spectrum reconstruction problem as an inverse problem.

16. The method of claim 11, wherein the one or more features comprise at least one of: a peak intensity value and location in the reconstructed energy spectrum, a first intensity signal on a first side of the peak intensity value in the reconstructed energy spectrum, a second intensity signal on a second side of the peak intensity value, a first gradient of the reconstructed energy spectrum on the first side of the peak intensity value, or a second gradient of the reconstructed energy spectrum on the second side of the peak intensity value.

17. The method of claim 16, wherein the one or more unique characteristics comprise at least one of: a relationship between the first intensity signal and effective atomic number, a relationship between the second intensity signal and density, a ratio between the first intensity signal and the second intensity signal, or a comparative difference between the first gradient and the second gradient.

18. The method of claim 11, wherein an impact of the relative location of the spatially distributed, independent detector assemblies is corrected for while reconstructing the energy spectrum.

19. The method of claim 11, wherein the array of 'm' detector assemblies comprises different types of detector materials to enhance detection of the backscattered X-rays based on an overlap of the attenuated scan data and presence of absorption edges within the detector materials.

20. An X-ray backscatter inspection system, comprising:
an X-ray source configured to direct a beam of X-rays onto a material, wherein the beam has a flying spot configuration;
a detector panel positioned to generate scan data corresponding to X-rays scattered back from the material, wherein the detector panel has an array of a plurality of spatially distributed and independent detector assemblies and comprises a plurality of filters, wherein at least one of the plurality of filters is positioned over each of the plurality of detector assemblies, and wherein each of the plurality of filters has a unique thickness that is based on a required number of energy bins in a range of energies of the generated scan data; and
a computing device including a processor and a memory coupled to the processor, wherein the memory stores a plurality of programmatic code which, when executed by the processor, causes the processor to:
acquire the scan data;
reconstruct an energy spectrum from the acquired scan data, wherein the reconstructed energy spectrum includes the required number of energy bins;
extract one or more features of the reconstructed energy spectrum using the energy bins;
based on the one or more features, identify one or more unique characteristics related to the material; and
based on the one or more characteristics, classify the material as being illicit or not illicit.

* * * * *